United States Patent
Du et al.

(10) Patent No.: US 12,057,561 B1
(45) Date of Patent: Aug. 6, 2024

(54) SYSTEMS AND METHODS FOR INDUCTION HEATING OF ELECTROLYTES

(71) Applicant: Ampcera Inc., Milpitas, CA (US)

(72) Inventors: Hui Du, Tucson, AZ (US); James Emery Brown, Tucson, AZ (US); Chen Chen, Tucson, AZ (US); Sumin Zhu, San Franscisco, CA (US)

(73) Assignee: Ampcera Inc., Milpitas, CA (US)

( * ) Notice: Subject to any disclaimer, the term of this patent is extended or adjusted under 35 U.S.C. 154(b) by 0 days.

(21) Appl. No.: 16/927,362

(22) Filed: Jul. 13, 2020

Related U.S. Application Data

(60) Provisional application No. 62/873,446, filed on Jul. 12, 2019.

(51) Int. Cl.

| | | |
|---|---|---|
| *H01M 10/615* | (2014.01) | |
| *H01G 11/18* | (2013.01) | |
| *H01M 6/50* | (2006.01) | |
| *H01M 8/04* | (2016.01) | |
| *H01M 8/04007* | (2016.01) | |

(52) U.S. Cl.
CPC .......... *H01M 10/615* (2015.04); *H01G 11/18* (2013.01); *H01M 6/5038* (2013.01); *H01M 8/04037* (2013.01); *H01M 2300/0091* (2013.01)

(58) Field of Classification Search
CPC ........... H01M 6/5038; H01M 8/04037; H01M 10/615
See application file for complete search history.

(56) References Cited

U.S. PATENT DOCUMENTS

| | | | |
|---|---|---|---|
| 732,616 | A | 6/1903 | Burgess et al. |
| 1,687,196 | A | 10/1928 | Daellenbach |
| 2,418,792 | A | 4/1947 | Coleman |
| 2,442,380 | A | 6/1948 | Schrodt et al. |
| 2,516,048 | A | 7/1950 | Endress |
| 2,615,933 | A | 10/1952 | Carlson et al. |
| 2,626,971 | A | 1/1953 | Percival |
| 2,700,064 | A | 1/1955 | Akerman |
| 2,710,937 | A | 6/1955 | Godshalk et al. |
| 2,761,006 | A | 8/1956 | Kramer |
| 2,938,066 | A | 5/1960 | Weigand |
| 3,623,471 | A | 11/1971 | Bogue et al. |
| 3,723,187 | A | 3/1973 | Toydoka et al. |
| 3,774,589 | A | 11/1973 | Kober |
| 4,025,861 | A | 5/1977 | Godard et al. |
| 4,095,938 | A | 6/1978 | Mikaila |
| 5,039,927 | A | 8/1991 | Centafanti |

(Continued)

FOREIGN PATENT DOCUMENTS

| | | |
|---|---|---|
| CN | 104916848 B | 9/2017 |
| CN | 108242551 | 7/2018 |

(Continued)

OTHER PUBLICATIONS

Machine translation of DE-102012210032-A1, Kanters (Year: 2013).*

(Continued)

*Primary Examiner* — Brian R Ohara
*Assistant Examiner* — Brent C Thomas
(74) *Attorney, Agent, or Firm* — Walters & Wasylyna LLC

(57) ABSTRACT

An electrochemical system includes: an anode; a cathode; an electrolyte; and at least one inductively heatable material embedded or suspended in the electrolyte.

18 Claims, 13 Drawing Sheets

(56) References Cited

U.S. PATENT DOCUMENTS

| | | | |
|---|---|---|---|
| 5,281,792 A | 1/1994 | Lee et al. | |
| 5,362,942 A | 11/1994 | Vanderslice, Jr. et al. | |
| 5,378,879 A | 1/1995 | Monovoukas | |
| 5,599,636 A | 2/1997 | Braun | |
| 5,948,298 A | 9/1999 | Ijaz | |
| 6,002,240 A | 12/1999 | McMahan et al. | |
| 6,096,456 A * | 8/2000 | Takeuchi | H01G 9/02 |
| | | | 429/249 |
| 6,392,388 B1 | 5/2002 | Young | |
| 6,575,156 B2 | 6/2003 | MacFarlane et al. | |
| 6,882,061 B1 | 4/2005 | Ashtiani et al. | |
| 7,264,902 B2 | 9/2007 | Horie et al. | |
| 7,947,925 B2 | 5/2011 | Suzuki et al. | |
| 8,574,738 B2 | 11/2013 | Fattig | |
| 8,791,397 B2 | 7/2014 | Kim et al. | |
| 8,852,772 B2 | 10/2014 | McDonald | |
| 9,083,065 B2 | 7/2015 | Carkner | |
| 9,214,703 B2 | 12/2015 | Ikeda | |
| 9,337,671 B2 | 5/2016 | Komori et al. | |
| 10,084,201 B2 | 9/2018 | Hatta et al. | |
| 10,147,950 B2 | 12/2018 | Sakshaug et al. | |
| 10,181,599 B2 | 1/2019 | Allison et al. | |
| 10,340,504 B2 | 7/2019 | Englert | |
| 2004/0241520 A1 | 12/2004 | Ha et al. | |
| 2008/0292964 A1 | 11/2008 | Takeuchi et al. | |
| 2009/0087723 A1 | 4/2009 | Inda | |
| 2010/0219107 A1 * | 9/2010 | Parsche | H05B 6/80 |
| | | | 208/402 |
| 2010/0323264 A1 | 12/2010 | Chiang et al. | |
| 2011/0059343 A1 * | 3/2011 | McKinney | H01M 10/0431 |
| | | | 429/94 |
| 2011/0305941 A1 | 12/2011 | Park et al. | |
| 2012/0107665 A1 | 5/2012 | Abe et al. | |
| 2013/0196243 A1 | 8/2013 | Braithwaite et al. | |
| 2013/0224632 A1 | 8/2013 | Roumi | |
| 2014/0076876 A1 | 3/2014 | Papajewski | |
| 2014/0113166 A1 | 4/2014 | Schneider et al. | |
| 2015/0037698 A1 | 2/2015 | Buzon et al. | |
| 2015/0064534 A1 * | 3/2015 | Lohmann | H01M 10/0585 |
| | | | 429/120 |
| 2016/0059733 A1 | 3/2016 | Hettrich et al. | |
| 2016/0200011 A1 * | 7/2016 | Rothfuss | B29C 35/12 |
| | | | 428/412 |
| 2016/0204408 A1 | 7/2016 | Herle | |
| 2017/0085107 A1 * | 3/2017 | Rastegar | H01G 11/54 |
| 2018/0108956 A1 | 4/2018 | Fortenbacher | |
| 2018/0141458 A1 | 5/2018 | Jammoul et al. | |
| 2018/0358829 A1 | 12/2018 | Rastegar et al. | |
| 2019/0074559 A1 | 3/2019 | Demund et al. | |
| 2019/0081371 A1 | 3/2019 | Bauer et al. | |
| 2019/0386357 A1 | 12/2019 | McHugh et al. | |
| 2020/0176835 A1 | 6/2020 | Rastegar et al. | |
| 2020/0212401 A1 | 7/2020 | Huang et al. | |
| 2020/0303729 A1 | 9/2020 | Kim | |
| 2020/0381935 A1 | 12/2020 | Shimada | |
| 2021/0175537 A1 | 6/2021 | Shin et al. | |

FOREIGN PATENT DOCUMENTS

| | | | |
|---|---|---|---|
| DE | 102007052147 | 5/2009 | |
| DE | 102008015621 A1 | 10/2009 | |
| DE | 102011002729 | 7/2012 | |
| DE | 102011108196 A1 | 1/2013 | |
| DE | 102012210032 A1 | 12/2013 | |
| DE | 102012210032 A1 * | 12/2013 | H01M 10/615 |
| DE | 102012210091 A1 | 12/2013 | |
| DE | 102012210146 A1 | 12/2013 | |
| DE | 102013221747 A1 | 4/2015 | |
| DE | 102013021255 A1 | 6/2015 | |
| DE | 102016208064 A1 | 11/2017 | |
| DE | 102016213159 A1 | 1/2018 | |
| DE | 102016214337 A1 | 2/2018 | |
| DE | 102017212275 | 1/2019 | |
| DE | 102017130559 A1 | 6/2019 | |
| DE | 102018210417 A1 | 1/2020 | |
| DE | 102018123910 A1 | 4/2020 | |
| DE | 102019214648 A1 | 3/2021 | |
| EP | 2827427 A1 | 1/2015 | |
| JP | 2003197277 A | 9/2006 | |
| JP | 2007-227209 | 9/2007 | |
| JP | 4139199 | 8/2008 | |
| JP | 2004178950 A | 8/2008 | |
| JP | 2010-160932 | 7/2010 | |
| JP | 5649594 | 1/2015 | |
| JP | 2013149414 A | 1/2015 | |
| JP | 6361322 B2 | 7/2018 | |
| JP | 6455538 B2 | 1/2019 | |
| JP | 6463570 B1 | 2/2019 | |
| KR | 10-2011-0020666 | 3/2011 | |
| KR | 20130130292 A | 12/2013 | |
| KR | 20150037242 A | 4/2015 | |
| KR | 101721916 B1 | 3/2017 | |
| KR | 10-1793311 | 11/2017 | |
| KR | 10-1816948 | 1/2018 | |
| KR | 102016122 B1 | 10/2019 | |
| KR | 102042755 B1 | 11/2019 | |

OTHER PUBLICATIONS

Stanislaw Grundas, Advances in Induction and Microwave Heating of Mineral and Organic Materials, 2011, ISBN: 9789533075228, Chapter 21, Magnetic Induction Heating of Nano-sized Ferrite Particles, p. 484-500.

Thomas Bayerl, Induction Heating of Thermoplastic Materials by Particulate Heating Promoters, Polymers & Polymer Composites, vol. 20, No. 4, 2012, p. 333-341.

Sophie Laurent and Morteza Mahmoudi, Superparamagnetic iron oxide nanoparticles: promises for diagnosis and treatment of cancer, International Journal of Molecular Epidemiology and Genetics, 2011; vol. 2, No. 4, p. 367-390.

Anthoney J. Bur, Dielectric properties of polymers at microwave frequencies: a review, Polymer vol. 26, No. 7, 1985, p. 963-977.

Xiao-Guang Yang, Asymmetric Temperature Modulation for Extreme Fast Charging of Lithium-Ion Batteries, Joule vol. 3, No. 12, 2019, p. 3002-3019.

Yi Zhang et al., Magnetic Induction Heating of Nano-sized Ferrite Particles, Advances in Induction and Microwave Heating of Mineral and Organic Materials, 2011, p. 484-500, Chapter 21, edited by Stanislaw Grundas.

Xiao-Guang Yang et al., Fast charging of lithium-ion batteries at all temperatures, PNAS, Jul. 10, 2018.

Stanley Zinn, Coil design and fabrication: Basic Design and Modifications, Oct. 1988, vol. 20, Issue 6, United States.

* cited by examiner

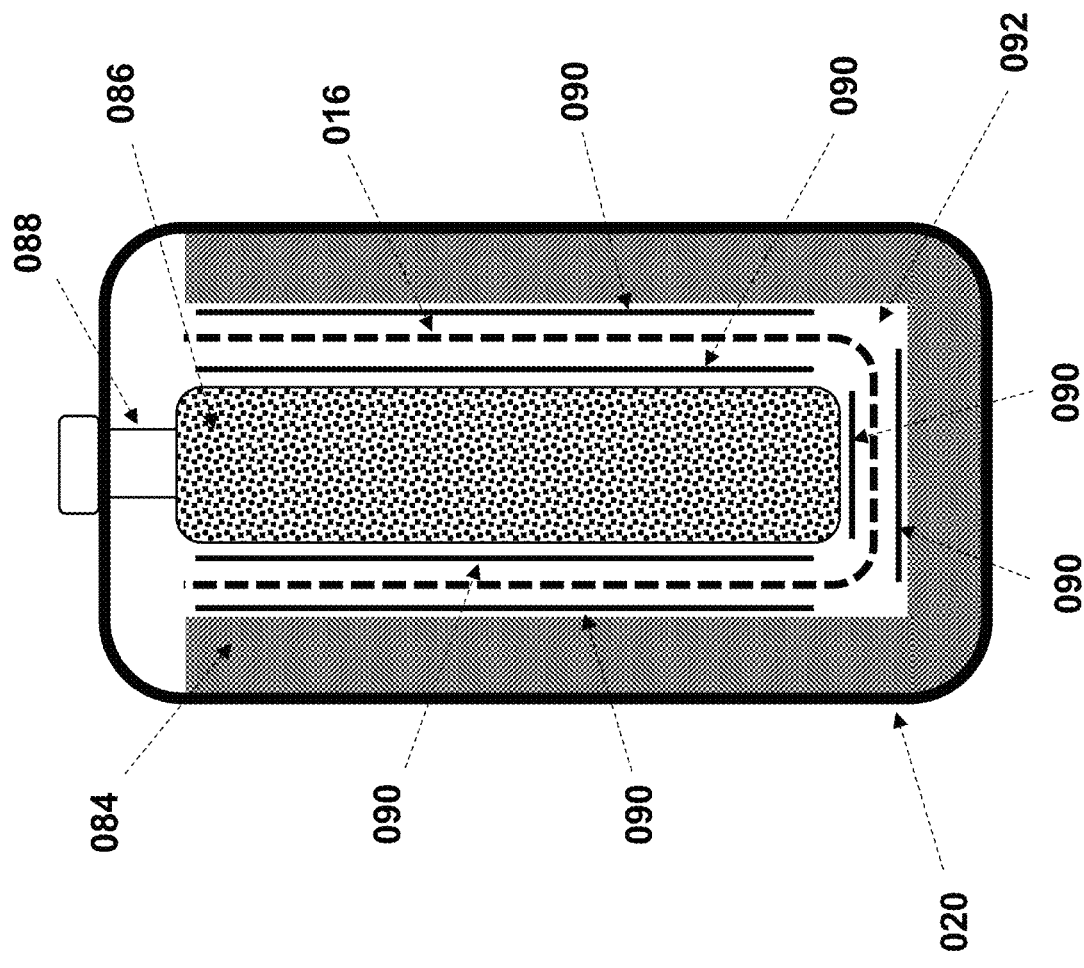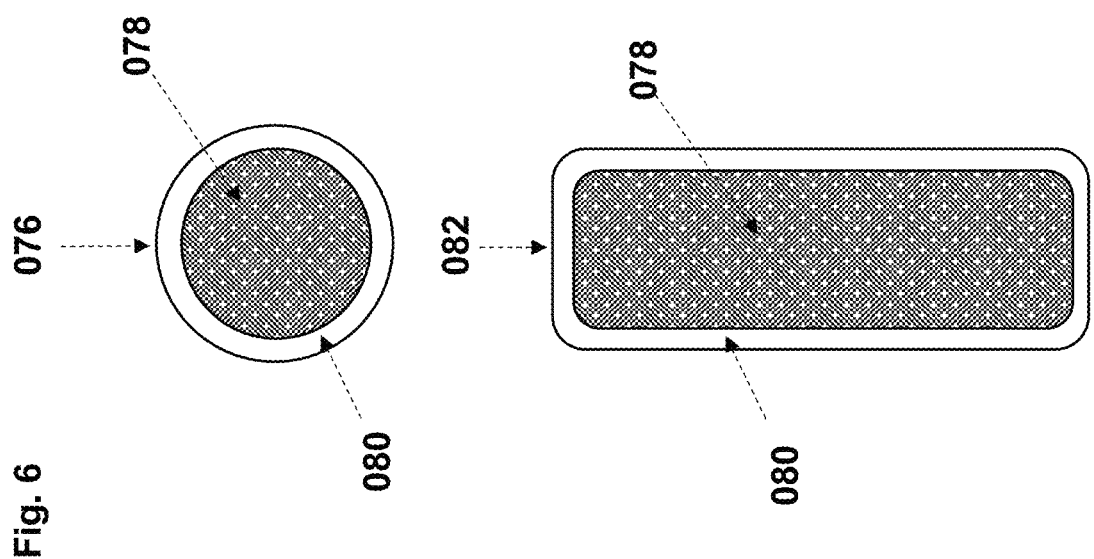
Fig. 6

SYSTEMS AND METHODS FOR INDUCTION HEATING OF ELECTROLYTES

PRIORITY

The present invention claims the priority of U.S. Provisional Patent Application No. 62/873,446, filed Jul. 12, 2019, which is incorporated herein by reference in its entirety.

FIELD

This invention relates to systems and methods for the induction heating of electrolytes in electrochemical systems, and, in particular, to systems and methods for the induction heating of electrolytes in electrochemical cells for operation in cold weather.

BACKGROUND

The electrolyte plays a critical role in electrochemical cells by providing an ionic conducting media positioned between the positive and negative electrodes. Depending on the nature of the electrochemical cell the electrolytes may be in the form of a liquid, such as an organic or aqueous-based liquid, or a solid, such as a polymer, ceramic, or a ceramic-polymer composite, or in some instances a molten-state. During cell operation ions conduct or flow through the electrolyte media from one electrode to the other. In some instances the ions conduct or flow in only one direction such as the case in primary batteries, zinc or aluminum air batteries, and fuel cells. In other instances the ions may conduct or flow in both directions depending on whether it is a charge or discharge cycle. Rechargeable electrochemical cell technologies may include secondary batteries, lithium-air batteries, electrochemical capacitors, or flow batteries.

SUMMARY

In cold weather electrochemical cells often have poor efficiency, and in some cases stop functioning all together due to extreme cold. The poor efficiency, or stoppage, of the cells is a result of the low ionic conductivity of the electrolyte due to low temperatures. In essence the flow of ions is impeded or prohibited altogether. To avoid this the electrolyte must be heated to raise the temperature and effectively the ionic conductivity. An effective way to heat the electrolyte is through induction heating using inductively heatable materials suspended or embedded within it. An induction coil may be designed within the electrochemical cell housing or casing, or external of the electrochemical cell but in the proximately in order to heat the inductive materials. An alternating current may be passed through the induction coil generating eddy currents inside the embedded or suspend heatable materials, thus heating the electrolyte. The alternating current may be continuous or pulsed at desired rates or frequencies in order to control the internal temperature of the electrolyte.

In an embodiment, an electrochemical cell may include an energy storage device or system. Alternatively, an electrochemical cell may include an energy conversion device or system.

In an aspect, an energy storage device or system may include, for example, non-rechargeable primary batteries such as dry cells.

In another aspect, an energy storage device or system may include rechargeable or secondary batteries. Such battery systems may include wet cells, solid-state cells, or a hybrid/semi solid-state cell with minimal liquid, or in some instance in a molten state.

In yet another aspect an energy storage device or system may include electrochemical capacitors. Electrochemical capacitors may also be termed supercapacitors or ultracapacitors.

In yet another aspect, an energy storage device or system may include a flow battery system. Such flow systems may include, for example, redox flow, hybrid flow, or semi-solid flow, etc.

In yet another aspect, an energy conversion device or system may include a fuel cell. Such fuel cell systems may include, for example, proton exchange membrane (PEM), alkaline (AFC), solid oxide (SOFC), etc.

In another embodiment, the nature of electrolytes may include, for example, aqueous liquid, nonaqueous liquid such as organic or inorganic, polymer, gel polymer, solid-state ceramics, ceramic-polymer composites, molten-salt, or a combination thereof.

In yet another embodiment, materials with inductive heating properties may be suspended or embedded within the electrolyte of the electrochemical cell.

In an aspect, materials with inductive heating properties may include materials such as quantum dots, nanoparticles, microparticles, irregular shapes, etc. Such materials may be coated with a thin electrical insulative layer as to avoid short circuiting of the electrochemical cell.

In another aspect, materials with inductive heating properties may include wires or fibers, such as nanofibers, nanorods, microfibers, microrods, etc. Such wires or fibers may be coated with a thin electrical insulative layer as to avoid short circuiting of the electrochemical cell.

In yet another aspect, materials with inductive heating properties may include a mesh such as metal mesh or foam structure. Such mesh or foam structures may be coated with a thin electrical insulative layer as to avoid short circuiting of the electrochemical cell.

In yet another embodiment, inductively heatable materials coated with a thin insulating layer may be deposited on, or embedded within, a battery separator. Such separators may include, for example, cellulosic, glass mats, polyolefin, polyethylene, polypropylene, etc.

In yet another embodiment, the embedded or suspended inductive heating materials may be heated using an inductive coil. The inductive coil may pass alternating current through it at pulsed intervals, or in some instances continuous, as to control the internal temperature of the electrolyte. The alternating current may generate a magnetic field within and around the coil where the electrochemical cell is located. The magnetic field may in turn generate eddy currents within the embedded or suspended inductive heating materials, heating the electrolyte.

In an aspect, the inductive coil may be located externally or away from the electrochemical cell. In this instance, the electrochemical cell is positioned within the coil or next to coil as to enable eddy currents to be generated within the embedded or suspended inductive heating materials.

In another aspect, the inductive coil may be located within the electrochemical cell. In this instance, the inductive coil may either be built into the outer casing, container, or house of the electrochemical cell or positioned just inside the electrochemical cell next to the outer casing, container, or house.

BRIEF DESCRIPTION OF THE FIGURES

FIG. 6: A schematic illustration of inductively heatable wires or fibers embedded or suspended in the liquid electrolyte of a primary Zinc-Carbon battery.

DETAILED DESCRIPTION

Figure 1:
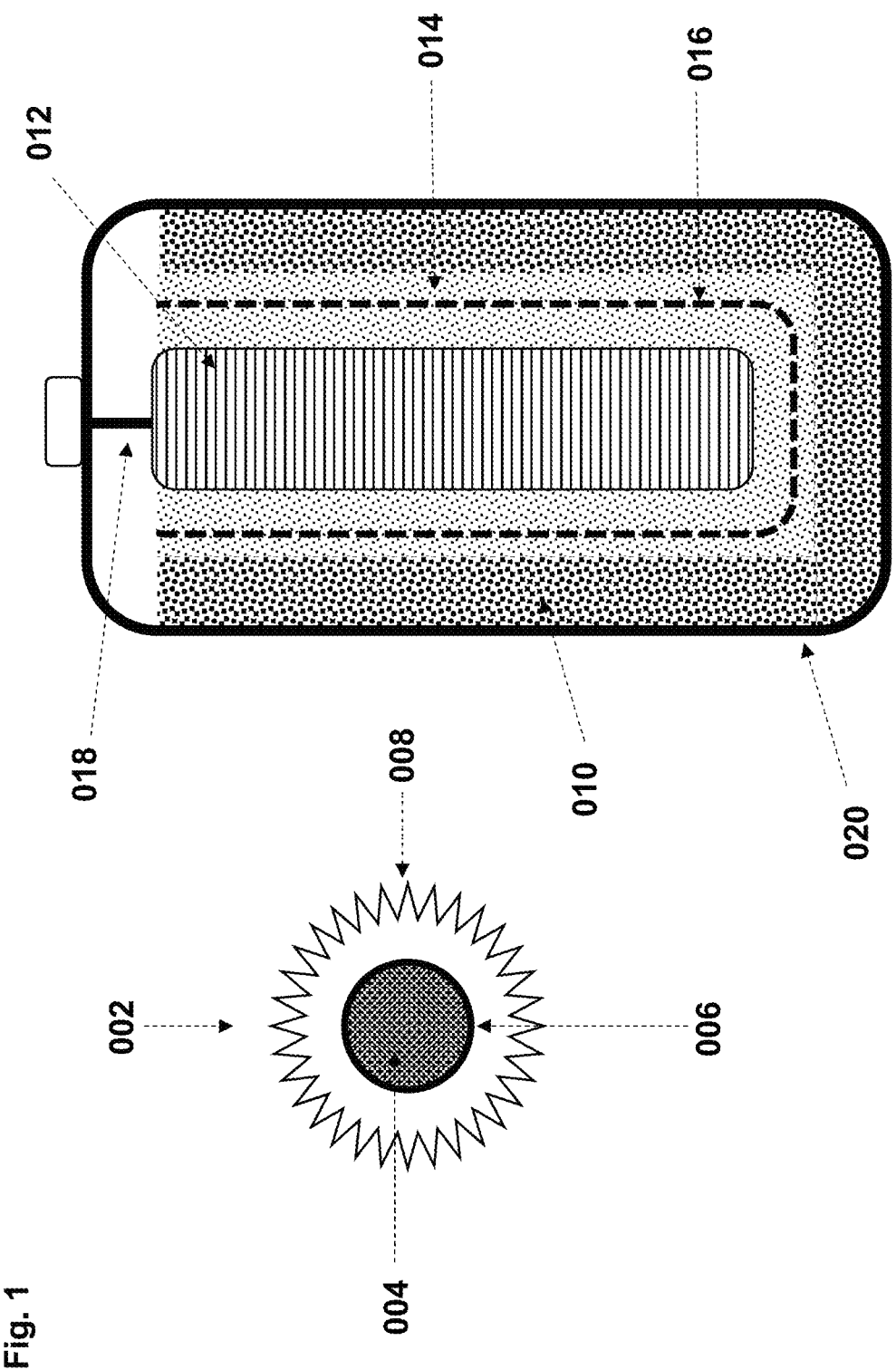
FIG. 1A schematic illustration of inductively heatable materials suspended in the electrolyte of a primary Alkaline battery.

In cold weather the efficiency of electrochemical cells can be scientifically reduce, or in some cases ease all together such as in the case of extreme cold. This is due to a reduction in the ionic conductivity of the electrolyte, or ion conducting media, or ion selective media, which can be in the form of a liquid, polymer, gel polymer, ceramic-polymer composite, or solid-state ceramic. Heating up the electrolyte and maintaining a sufficient internal temperature is the keep to electrochemical cell operation in cold weather. A method to do this may include the induction heating of materials, with induction heating properties, embedded or suspended in the electrolyte. Inductive heating materials may range in size from nanoparticles to macro sized meshes. The induction heating may be used to heat up and maintain an internal electrolyte temperature, ranging from room temperature to 1000 degrees Celsius, depending on the type of electrochemical cell, to enhance performance in cold weather. An alternating current, either continuous or pulsed, can be passed through an induction coil generating a magnetic field. The magnetic field can in turn generate eddy currents inside the embedded or suspended materials, heating the electrolyte. An induction coil may be external of the electrochemical cell, wherein the electrochemical cell is either located inside the coil or position in the proximity thereof, or in some instances built into the housing or container of the electrochemical cell.

The present disclosure relates to types of electrochemical systems.

Electrochemical systems may include, for example, primary batteries, secondary batteries, electrochemical capacitors, flow batteries, fuel cells, etc.

The present description relates to primary batteries.

A primary battery may be defined as a non-rechargeable battery with only one discharged cycle.

Types of primary batteries may include, for example, alkaline batteries (or alkaline zinc-manganese dioxide), zinc-carbon batteries (or Leclanché cell), zinc chloride batteries (or heavy duty), silver-oxide batteries (or zinc-silver oxide), mercury batteries (or zinc-mercuric oxide), nickel oxyhydroxide batteries, magnesium batteries, lithium batteries (lithium carbon monofluoride, lithium iron disulfide, lithium-thionyl chloride, lithium manganese dioxide, lithium sulfide dioxide), aluminum-air, zinc-air, sugar batteries, paper batteries, organic radical battery, etc.

Alkaline or alkaline zinc-manganese dioxide batteries may be characterized as a dry cell primary battery with a zinc powder/gel negative electrode (anode) and manganese dioxide/carbon paste (positive electrode or cathode) coated on to the container, wherein an alkali metal hydroxide solution such as potassium hydroxide serves as the electrolyte.

Zinc-carbon (Lechanché or Standard Duty) batteries may be characterized as a dry cell primary battery with zinc serving as both the negative electrode (anode) and container and manganese dioxide as the positive electrode (cathode) on a carbon rod serving as the current collector, wherein an ammonium chloride solution serves as the electrolyte.

Zinc chloride (Heavy Duty, Super Heavy Duty, Extra Heavy Duty) batteries may be characterized as a dry cell primary battery with zinc serving as both the negative electrode (anode) and container and a manganese dioxide positive electrode (cathode) on a carbon rod serving as the current collector, wherein a zinc chloride solution serves as the electrolyte.

Silver-oxide or zinc-silver oxide batteries may be characterized as a dry cell primary battery with zinc or an amalgamated zinc gel as the negative electrode (anode) and a silver oxide paste as the positive electrode (cathode), wherein an alkali metal hydroxide solution such as potassium hydroxide or sodium hydroxide serves as the electrolyte. In some instances the negative electrode may have a small percentage ($\leq 1\%$) of mercury. In other instances the positive electrode may be mixed with manganese dioxide.

Mercury or zinc-mercury oxide batteries may be characterized as a dry cell primary battery with a with zinc as the negative electrode (anode) and mercury oxide as the positive electrode (cathode), where an alkali metal hydroxide solution such as potassium hydroxide or sodium hydroxide serves as the electrolyte. In some instances, the manganese dioxide may be mixed into the positive electrode.

Nickel oxyhydroxide batteries may be characterized as a dry cell primary battery with zinc as the negative electrode (anode) and manganese dioxide mixed with nickel oxyhydroxide as the positive electrode (cathode), wherein an alkali metal hydroxide solution such as potassium hydroxide serves as the electrolyte.

Magnesium batteries may be characterized as a dry cell primary battery with magnesium as the negative electrode (anode) and silver chloride as the positive electrode (cathode) as in the case of the BA-4386, wherein the battery is activated with water to form a silver chloride electrolyte solution.

Lithium batteries may be characterized as a primary battery with lithium metal as the negative electrode (anode) and a variety of materials as the positive electrode (cathode). For instance, Lithium Carbon Monofluoride batteries use carbon monofluoride as the cathode. In another instance, Lithium Iron Disulfide batteries use iron disulfide as the cathode. In yet another instance, Lithium Manganese Dioxide batteries use manganese dioxide as the cathode. In yet another instance, Lithium Copper Oxide batteries use copper oxide as the cathode. These lithium batteries use an organic-based electrolyte such as lithium perchlorate or lithium tetrafluoroborate in propylene carbonate.

Another example of a primary lithium battery is the Lithium Thionyl Chloride battery which uses liquid thionyl chloride as the cathode and a non-aqueous inorganic electrolyte such as lithium tetrachloroaluminate dissolved in thionyl chloride. In some instances, bromide chloride may be added to the thionyl chloride cathode to increase voltage. Such batteries are typically used for cold weather environments, wherein induction heating is expected to only increase the temperature to a sufficient operating temperature in extreme cold environments.

Other primary lithium batteries may be specialized having a cathode composed of, for example, lithium silver chromate, lithium silver vanadium oxide, lithium lead bismuthate, lithium bismuth trioxide, lithium copper sulfide, lithium lead copper sulfide, lithium iodine, lithium sulfur dioxide, lithium sulfuryl chloride, etc.

Standard sizes of primary batteries may include, for example, cylindrical (D, C, AA, AAA, AAAA, etc.), button or coin cell (LR44, CR2032, CR2016, CR2025, BR2330, CR2330, LR1154, SR516, etc.), 4.5V multicell, 9V multicell, etc.

Zinc-air batteries are a primary metal-air battery ranging in size from a button cell to large scale for grid energy storage backup. Zinc-air batteries may contain a zinc anode and a porous cathode containing a catalyst, wherein an alkali metal hydroxide solution such as potassium hydroxide may serve as the electrolyte.

Aluminum-air batteries are a primary metal-air battery with an aluminum metal and a porous cathode containing a catalyst, wherein metal hydroxide solution such as potassium hydroxide may serve as the electrolyte. Alternatively, seawater may be used as an electrolyte in some instances. An exemplary cathode is composed of a nickel grid coated with a layer of carbon and a cobalt catalyst, all coated with a porous hydrophobic layer of polytetrafluoroethylene (PTFE).

The present description relates to secondary batteries.

A secondary battery may be defined as a battery that is rechargeable or not limited to one discharge cycle.

A secondary battery has an anode and cathode that are in electrical contact through an external circuit but physically separated by an electrolyte, and in some instances a separating porous material.

Secondary batteries may be in the form of, for example, ion-based batteries, metal batteries, air-batteries, thin film batteries, or micro batteries.

Types of secondary ion-based batteries, or intercalation batteries, may include, for example, lithium ion batteries, lithium-ion polymer, sodium ion batteries, magnesium ion batteries, aluminum ion batteries, potassium ion batteries, zinc ion batteries, lithium titanate battery, etc.

A positive electrode cathode for an ion-based secondary battery may include an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.3 \geq y \geq 0.025$, $0.2 \geq z \geq 0.025$), lithium nickel manganese spinel ($LiNi_{0.5}Mn_{1.5}O_4$), etc.

A negative electrode or anode for an ion-based secondary battery may include an active material such as, for example, graphite, titanate, titanium oxide, silicon, tin oxide, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

Ion-based secondary batteries may be defined as a liquid battery with a liquid electrolyte, a polymer battery with a polymer or gel-polymer electrolyte, a solid-state battery with a solid-polymer, solid-state ceramic, or a composite electrolyte, or a combination thereof.

In the case of a liquid or polymer battery, the negative electrode may be coated with an artificial solid electrolyte interface layer.

In the case of a solid-state battery, the positive and negative electrodes may contain an ionic conductive media to facility ion transportation in said electrode.

In the case of a solid-state battery, the positive electrode and/or the negative electrode may be coated with a protective layer to reduce resistance at the electrode/electrolyte interface. Such layers are assumed to be composed materials capable of ionic conduction.

Types of secondary metal-based batteries may include, for example, lithium metal batteries, sodium metal batteries, magnesium metal batteries, aluminum metal batteries, potassium metal batteries, zinc metal batteries.

A positive electrode cathode for a metal-based secondary battery may include an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.3 \geq y \geq 0.025$, $0.2 \geq z \geq 0.025$), lithium nickel cobalt aluminum oxide ($LiNi_xCo_yAl_zO_2$, $0.3 \geq y \geq 0.025$, $0.2 \geq z \geq 0.025$), lithium nickel manganese spinel ($LiNi_{0.5}Mn_{1.5}O_4$), etc.

A negative electrode anode for a metal-based secondary battery may include, for example a metal or metal-alloy interacting with ions through a plating and stripping mechanism. Such metal anodes may comprise of, for example, lithium metal, lithium metal alloy, sodium metal, sodium metal alloy, magnesium metal, magnesium metal alloy, aluminum metal, aluminum metal alloy, potassium metal, potassium metal alloy, zinc metal, zinc metal alloy. Alloying materials may include, for example, indium, manganese, etc.

Metal-based secondary batteries may be defined as a liquid battery with a liquid electrolyte provided that dendrite formation is prohibited, a polymer battery with a polymer or gel-polymer electrolyte provided that dendrite formation is prohibited, or a solid-state battery with a solid-polymer, solid-state ceramic, or a composite electrolyte, or a combination thereof.

In the case of a liquid or polymer battery, the negative electrode may be coated with an artificial solid electrolyte interface layer.

In the case of a solid-state battery, the positive electrode may contain an ionic conductive media to facility ion transportation in said electrode.

In the case of a solid-state battery, the positive electrode and/or the metal/metal alloy anode may be coated with a protective layer to reduce resistance at the electrode/electrolyte interface. Such layers are assumed to be composed materials capable of ionic conduction.

Types of secondary air-batteries may include, for example, lithium-air batteries, sodium-air batteries, potassium-air batteries, iron-air batteries, silicon-air batteries.

A secondary air-battery may contain metal, metal alloy, metal oxide as the negative electrode or anode. For example, a lithium-air battery may contain lithium metal or a lithium metal alloy. A sodium-air battery may contain sodium metal or sodium metal alloy. A potassium-air battery may contain potassium metal or a potassium metal alloy. A silicon-air battery may contain silicon metal, a silicon wafer, or a silicon alloy. An iron-air battery may contain iron metal or iron oxide anode.

A secondary air-battery anode may be coated with a thin layer to serve as, for example, an artificial solid electrolyte interface layer as a protective layer or a layer to reduce resistance at the electrode electrolyte interface where in the air-battery is composed of a solid-state electrolyte.

A secondary air-battery may contain a porous cathode structure as to allow atmospheric oxygen to enter the system. The porous cathode may be composed of carbon such as a mesoporous carbon. Alternatively, the porous cathode may be a screen, grid, or foam material such as nickel foam, and coated with a carbon layer.

The secondary air-battery may contain a catalyst such as, for example, manganese, cobalt, ruthenium, platinum, silver, or a combination thereof. A catalyst may be deposited onto the carbon in the instance of a catalyst particle or oriented within the carbon structure as a dopant.

Alternatively, a secondary air-batteries may be devoid of a cathode structure where atmospheric oxygen acts as the cathode, as in the case of silicon-air batteries.

A secondary air-battery may contain an electrolyte with the nature or composition of, for example, aprotic, aqueous, mixed aqueous/aprotic, or solid-state.

Other types of secondary batteries may include, for example, lead acid battery, nickel cadmium battery, nickel-metal hydride battery, silver-zinc battery, nickel-iron battery, nickel-zinc battery, lithium-sulfur battery, rechargeable alkaline battery, glass battery or organic radical battery.

Lead acid batteries may be characterized as a secondary battery with a lead plate for negative electrode (anode) and lead oxide plate for the positive electrode (cathode) in the charged state, wherein aqueous sulfuric acid is the electrolyte. In the discharge state both plates may become lead sulfate. Such batteries may be in the form of a liquid cell, wherein a separate may be rubber, glass fiber, cellulose, or polyethylene, in the form of a gel which comprise of a silica gelling agent, or in the form of a absorbed glass mate (AGM) with limited sulfuric acid. The gel and AGM forms may be further classed as a maintenance free, sealed, and/or valve-regulated lead acid (VRLA).

Nickel cadmium batteries may be characterized as a secondary battery with metallic cadmium as the negative electrode (anode) and nickel oxide hydroxide as the positive electrode (cathode), wherein an alkali metal hydroxide solution such as potassium hydroxide may serve as the electrolyte. Nickel cadmium batteries may be sealed, as in the case of small compact cells, or vented as in the case for stand by emergency power backup or aviation purposes.

Nickel-metal hydride batteries may be characterized as a secondary battery with nickel oxide hydroxide as the positive electrode (cathode) and a hydrogen absorbing alloy as the negative electrode (anode), wherein an alkali metal hydroxide solution such as potassium hydroxide may serve as the electrolyte. A hydrogen absorbing alloy may be designated as an $AB_5$, where A is a mixture of lanthanum, cerium, neodymium, praseodymium, and B is nickel, cobalt, manganese, or aluminum, or an $AB_2$, where A is titanium or vanadium, and B is zirconium or nickel, modified with chromium, cobalt, iron, or manganese.

Silver-zinc batteries may be characterized as a secondary battery with metallic silver as the positive electrode (cathode) and a mixture of zinc oxide and pure zinc powders as the negative electrode (anode); wherein an alkali metal hydroxide solution such as potassium hydroxide may serve as the electrolyte.

Nickel-iron batteries may be characterized as a secondary battery with an iron plate as the negative electrode (anode) and nickel oxide hydroxide as the positive electrode (cathode), wherein an alkali metal hydroxide solution such as potassium hydroxide may serve as the electrolyte.

Nickel-zinc batteries may be characterized as a secondary battery with metallic zinc as the negative electrode (anode) and nickel oxide hydroxide as the positive electrode (cathode), wherein an alkali metal hydroxide solution such as potassium hydroxide may serve as the electrolyte.

Lithium-sulfur batteries may be characterized as a secondary battery with metallic lithium as the negative electrode (anode) and sulfur as the positive electrode (cathode); wherein a liquid organic solution composed of lithium salt and an ether, such as cyclic ether, short-chain ether, or glycol ether, or a combination thereof, serve as the electrolyte. Alternatively, the anode may be composed of carbon, lithiated carbon, or silicon. In some instance the sulfur cathode may be encapsulated within a carbon structure, or a structure of similar design, or coated with a polymer as to reduce or prevent the polysulfide shuttle effect.

Secondary batteries may also include molten-salt batteries such as, for example sodium-sulfur or sodium-nickel chloride (Zebra) batteries.

A sodium-sulfur (NaS) battery may be characterized as a secondary molten-salt battery with metallic sodium as the negative electrode (anode) and sulfur as the positive electrode (cathode); wherein both electrodes are typically in a liquid state during battery operation. An electrolyte for an NaS battery may include, for example, beta alumina ceramic solid electrolyte typically in tubular form. NaS batteries may have an operating temperature in the range of 225 to 350 degrees Celsius.

A sodium-nickel chloride ($Na-NiCl_2$) or Zebra battery may be characterized as a secondary molten-salt battery with metallic sodium as the negative electrode (anode) and nickel as the positive electrode (cathode); wherein the sodium is in liquid state during battery operation. An electrolyte for a $Na-NiCl_2$ battery may include, for example, molten sodium tetrachloroaluminate ($NaAlCl_4$), with ceramic beta alumina serving as a separator between $NaAlCl_4$ and molten sodium. Na—NiCl$_2$ batteries may have an operating temperature in the range of 225 to 350 degrees Celsius.

In secondary molten-salt batteries it is assumed that induction heating materials would be embedded in the beta alumina, or an any other ceramic ionic conducting electrolyte. The induction heating materials may be used to soften or melt the components of the molten-salt battery, components as in those that are expected to be molten, in cold environments, or in some instances in ambient conditions when needed. The induction heating materials may be used to heat up the battery to, and maintain at, the desirable temperature range in cold environments, or in some instances in ambient conditions when needed.

In secondary molten-salt batteries the induction heating materials may be used to rapidly heat the battery to the desirable temperature range in cold environments, or in some instances in ambient conductions when needed. The induction heating materials may allow for the molten-salt batteries to remain in a nonmolten state when not in use, provided that the induction heating materials sufficiently heat or molt the components in a rapid manner.

The present description relates to electrochemical capacitors.

An electrochemical capacitor may also be referred to as a Supercapacitor or ultracapacitor.

An electrochemical capacitor may be classified as an electrochemical double layer capacitor or EDLC, pseudocapacitor, or hybrid capacitor also termed an asymmetrical capacitor, supercapattery, or supercabattery.

An electrochemical double layer capacitor may be characterized as an electrochemical capacitor that stores electrical charge electrostatically in the form of an electric double layer at the electrode/electrolyte interface. Electrodes in electrochemical double layer capacitors are generally composed of like carbon materials terming them symmetric capacitors. Electrodes are generally composed of high surface area active carbon coated onto metallic current collectors. Other carbon materials may include, for example, amorphous carbon, activated carbon fibers (ACFs), carbon fiber cloth (AFC), carbide-derived carbon (CDC), carbon aerogel, graphite, graphene, graphane, reduced graphene oxide (rGO), graphene oxide (GO), and carbon nanotubes (CNTs) such as single walled carbon nanotubes (SWCNTs), multiwalled carbon nanotubes (MWCNTs), or vertically aligned carbon nanofibers (VACNFs). Electrolytes in electrochemical double layer capacitors may include, for example, aqueous, organic, or ionic liquids.

A pseudocapacitor may be characterized as an electrochemical capacitor that stores electrical charge mainly through electrochemical pseudocapacitance, wherein electrochemical pseudocapacitance is a combination of reversible faradic charge-transfer between the electrolyte and electrode, intercalation, and electrosorption at the electrode surface and electrolyte interface. Electrodes in pseudocapacitor are generally composed of like materials with two or more valence states terming them symmetric capacitors. Electrode materials may be composed of either transition metal oxides or electrically conducting polymers (ECPs). Transition metal oxides may include, for example, ruthenium oxide, iridium oxide, manganese oxide, iron oxide, vanadium oxide, nickel oxide, or cobalt oxide. Polymers may include, for example, polyaniline, polythiophene, polypyrrole, polyacetylene, etc. Polymers may be n-doped and used as the negative electrode or p-doped and used as the positive electrode. Alternatively, sulfides may be used as an electrode in some instances such as titanium sulfide. Electrode materials may be coated onto high surface area carbon materials to enhance the surface area. Electrolytes in pseudocapacitors may include, for example, aqueous, organic, or ionic liquids.

A hybrid capacitor may be characterized as an electrochemical capacitor with two electrodes of different materials, wherein one electrode (electrode 1) stores electrical charge through a double layer at the electrode/electrolyte interface, and the other electrode (electrode 2) stores electrical charge through electrochemical pseudocapacitance. Hybrid capacitors may also be termed asymmetrical capacitors, supercapattery, supercabattery, battery capacitors, or in specific circumstances lithium-ion capacitors. Electrode 1 is generally composed of high surface area active carbon (AC), or any other carbon material known in the art. Electrode 2 is generally composed of a transition metal oxide or an electrically conducting polymer (ECP) that may be n- or p-doped. Electrode 2 may be coated or anchored onto a high surface area carbon material to enhance surface area. In some instances electrode 2 may also consist of a battery intercalation material known in the art. Electrolytes in hybrid capacitors may include, for example, aqueous, organic, or ionic liquids.

The present description relates to flow batteries.

A flow battery, also termed a redox flow battery, is a type of electrochemical cell where electrochemical energy is stored and provided by two electrochemical components dissolved in liquids termed a catholyte and analyte, which are contained within a system and separated by an ion-exchange or ion-selective or a ceramic ion-conducting membrane.

The catholyte and anolyte are stored in tanks and are pumped into the cell or cells of a reactor. A reactor cell consists of two chambers separated by an ion-exchange, ion-selective, or ceramic ion-conducting membrane, that are either cation or anion selective depending on the system. A chamber may consist of a current collect and porous electrode in which the catholyte or analyte flows past and flows through; wherein the electron transfer process takes place. Ions, either cationic or anionic depending on the system, are exchanged across the membrane. Alternatively, a reactor cell may consist of one chamber with a current collector and porous electrode in which a liquid, typically a catholyte, flows past and through. On the opposing side of the membrane lies a metallic or alloy-based electrode in ionic contact with the membrane. In this instance, the system contains only one liquid, typically a catholyte, with the dissolved electrochemical component.

Flow batteries may also be referred to as a regenerative fuel cell or a secondary fuel cell. The energy stored in a flow battery may be governed by the size of the anolyte and/or catholyte storage tanks.

Types of flow batteries may include, for example, redox, hybrid, organic, metal hydride, nano-network, or semi-solid.

A redox type flow battery may be characterized as a flow battery with reversible oxidization and reduction reactions occurring at the porous electrodes within the catholyte and analyte chambers; wherein the catholyte and analyte are separated by an ion-exchange or ion-selective membrane, or some instances a ceramic ion-conducting membrane. An ion-exchange or ion-selective or ceramic ion-conducting membrane may be cationic or anionic depending on the system. An example of a redox type flow battery may include, for example, vanadium redox flow, polysulfide redox flow, uranium redox flow, zinc-polyiodide redox flow, zinc-bromide redox flow, zinc-cerium redox flow, etc. In a redox type flow battery, an inductive heatable material is assumed to be embedded within the ion exchange or conducting membrane.

A hybrid type flow battery may be characterized as a flow battery where only one liquid component flows into the cell reactor, typically a catholyte; wherein one chamber has a porous electrode and current collector and the other consists of only a solid electrode and current, typically in metallic or alloy form. An ion-exchange or ion-selective or ceramic ion-conducting membrane separates the two chambers. A metallic or alloy electrode is in ionic contact with the ion-exchange or ion-selective or solid ion-conducting membrane, typically through an ionic conducting solution. The catholyte flows through the porous electrode on the opposing side of the membrane. An example of a hybrid type flow battery may include, for example, lead-acid, iron-salt, zinc-bromide, or zinc-cerium where zinc metal is the electrode, lithium, or sodium types where metallic lithium or sodium is the electrode. In a hybrid type flow battery, an inductive heatable material is assumed to be embedded within the ion exchange or conducting membrane.

A semi-solid flow battery may be characterized as a flow battery with active secondary battery intercalation materials suspended in the catholyte and analytes, wherein ions, typically lithium or sodium, intercalate into and out of the active materials. During the discharge process, ions intercalate out of the active materials in the catholyte and intercalate into the active materials in the analyte. The reverse process occurs in the charging process. Alternatively, the active materials may be stationary and located in the collection tanks as opposed to being suspend. In such a flow designs, the catholyte and analyte are more accurately referred to as an electrolyte, and a porous separate is used to allow ions to flow back and forth as opposed to an ion-exchange membrane. In the instance that the active materials are suspended in the electrolyte, the porous separator prevents the crossing or mixing of said active materials. In a semi-solid flow battery, inductive heatable materials are assumed to be suspended in the electrolyte solution on both sides of the porous membrane or fixed in the reactor chamber. It could also be further assumed, and as another example, that the inductive heatable materials are deposed on, or embedded within the porous membrane.

Other types of flow batteries such as, for example, organic, both aqueous and nonaqueous types, metal hydride, and nano-structure; wherein the flow batteries have a similar design to either that of a redox or hybrid system, and use an ion-exchange, ion-selective, or ceramic ion conducting membrane. Electrodes, catholytes, and analytes are specific for each system and are described elsewhere in the art. In such systems an inductive material is assumed to be embedded within the conducting membrane.

The present description relates to fuel cells.

A fuel cell may be referred to as an electrochemical cell that continuously converts the chemical energy of a fuel, typically hydrogen, into direct electrical energy or direct current without the ability to store it for later use, also referred to as an electrochemical energy conversion system.

A typical fuel cell is composed of a negative electrode (anode) and a positive electrode (cathode), which are separated by an ionic conducting electrolyte. The electrodes, typically porous carbon, may be coated with, or contain, or composed of a catalyst, which may vary by fuel cell types. A negative electrode catalyst may include, for example, platinum which is used to convert hydrogen gas into protons and electrons. Electrons travel from the negative electrode to the positive electrode through an electrical circuit containing what is often referred to as the load, while hydrogen ions conduct or are exchanged through the electrolyte to the positive electrode. A positive electrode catalyst may include, for example, nickel that converts the hydrogen ions into water, a byproduct, using an oxidizing agent, typically oxygen. However, the makeup of the fuel cell components, and the process of generating electricity is dependent on the fuel cell type.

Fuel cells may be arranged in stacks, often referred to as a stacked fuel cell or simply the fuel cell. The stacks may be connected in series to reach sufficient voltage.

The fuel used in fuel cells is typically in the form of hydrogen gas. In some instances, hydrogen gas is supplied directly to the fuel cell. In other instances, hydrogen gas is derived from another fuel sources such as, for example, coal, butane, methanol, ethanol, diesel, etc. The conversion of such fuels to hydrogen may be done externally of the fuel cell, or internally within the fuel cell structure. In yet another instance, a non-hydrogen fuel source may be directly used such as, for example, methanol in which such fuel cells may be referred to as direct methanol fuel cells.

Fuel cells may be classified depending on the type of electrolyte and start up time. A start up time may be referred to as the time it takes to turn on or initiate the conversion process until max efficiency of said fuel cell is reached.

Types of fuel cells may include, for example, proton exchange membrane fuel cells, phosphoric acid fuel cells, solid acid fuel cells, alkaline fuel cells, solid oxide fuel cells, or molten-carbonate fuel cells.

A proton exchange membrane fuel cell (PEMFC), also referred to as a solid polymer electrolyte fuel cell, may be characterized as a fuel cell with a polymer electrolyte, typically Nafion, a sulfonated tetrafluoroethylene based fluoropolymer-copolymer, which conducts hydrogen atoms from the negative electrode to the positive electrode. In such a fuel cell hydrogen diffused to the anode catalyst where it is dissociated into protons and electrons. The protons conduct through the membrane to the positive electrode (cathode) where they react with oxygen at the cathode catalyst to form water as a byproduct. Electrodes are typically composed of carbon papers coated with a catalyst. The electrodes and polymer membrane structure may be referred to as the membrane electrode assembly (MEA). PEM fuel cells may also contain bipolar plates typically composed of, for example, graphite, C—C composites, metal, coated metal, carbon-polymer composites, etc. Fuels other than hydrogen may be used such as, for example, chemical hydrides, diesel, and methanol which may be further classified as a direct-methanol fuel cell or indirect methanol fuel cell.

A phosphoric acid fuel cell (PAFC) may be characterized as a fuel cell that uses phosphoric acid as the electrolyte to conduct hydrogen ions or protons, as opposed to the Nafion membrane in PEMs. A PAFC typically has the same features of, and functions in a similar matter to, PEM fuel cells. PAFCs operate at a higher temperature than PEMs, typically in the range of 150 to 200 degrees Celsius. It is assumed that the induction heatable materials would be suspended within the phosphoric acid electrolyte. The induction materials may be used to heat up the electrolyte to desired temperatures in cold weather.

A solid acid fuel cell (SAFC) may be characterized as a fuel cell that uses a solid acid material as the electrolyte membrane; wherein the solid acid material may undergo a phase transition at temperatures above 140 degrees Celsius to become a highly disordered superprotonic structure with increased ionic conductivity. Solid acid materials may include, for example, cesium hydrogen sulfate ($CsHSO_4$) or cesium dihydrogen phosphate ($CsH_2PO_4$). SAFC typically operate in the range of, for example, 140-150 degrees Celsius. It is assumed that the induction heatable materials would be embedded within the solid acid electrolyte material. The induction materials may be used to heat up the electrolyte to, and maintain at, the desired temperature to form the superprotonic structure in cold weather, and in some cases at ambient conductions when needed.

An alkaline fuel cell (AFC), also referred to as a hydrogen-oxygen fuel cell, may be characterized as a fuel cell that uses an alkali metal hydroxide solution such as potassium hydroxide or sodium hydroxide as the electrolyte. In AFCs hydrogen gas and oxygen gas (typically atmosphere) is bubbled into the electrolyte through a porous carbon electrode coated with a catalyst. The design structure of an AFC is assumed to be similar in nature to a PEM. AFC typically operate in a temperature range of 70-140 degrees Celsius. Induction heating materials may be suspended or embedded within the solution to heat up the electrolyte to, and maintain at, the desired temperature in cold weather, and in some cases at ambient conductions when needed.

A solid oxide fuel cell (SOFC), also referred to as a high temperature fuel cell, may be characterized as a fuel cell that uses a ceramic-based electrolyte capable of conducting oxygens ions from the positive electrode (cathode) to the negative electrode (anode). SOFC differs from other fuel cell types wherein its oxygen ions conducting to the negative electrode as opposed to hydrogen ions or protons conducting to the positive electrode. Oxygen ions conduct to the negative electrode to react with hydrogen gas to produce electricity and water as byproducts. A ceramic electrolyte in SOFC may include, for example, yttria-stabilized zirconia (YSZ) or cerium gadolinium oxide (CGO). The electrolyte may be in the form of, for example, planar, non-planar, rolled, rod, tubular, etc. An SOFC may have the capability of reforming non-hydrogen fuels such as, for example, propane, methane, or butane into hydrogen gas. SOFCs may have a high operating temperature range of 800-1000 degrees Celsius in order to achieve sufficient oxygen conductivity. Induction heating materials may be embedded within the ceramic electrolyte to heat up, and maintain at, the desired temperature in cold weather, and in some cases at ambient conductions when needed. The induction heating materials may also be used to reduce the startup time of SOFCs in cold weather, and in some instances at ambient conductions when needed.

A molten-carbonate fuel cell (MCFC), also referred to as a high temperature fuel cell, may be characterized as a fuel cell that contains a lithium potassium carbonate salt electrolyte that is liquefied at high temperatures. The liquification enables the movement of negatively charged carbonate ions. Hydrogen gas reacts with the carbonated ions at the negative electrode to form water, carbon dioxide, and electricity as byproducts. At the positive electrode, oxygen (typically from the atmosphere) reacts with the carbon dioxide and electron byproducts to form carbonate ions, replenishing the electrolyte. MCFCs typically operate at a temperature above 600 degrees Celsius. Induction heating materials may be embedded within the salt electrolyte to heat it up, liquefy it, and maintain it at, the desired temperature in cold weather, and in some cases at ambient conductions when needed. The induction heating materials may also be used to reduce the startup time of MCFCs in cold weather, and in some instances at ambient conductions when needed.

Other types of fuel cells and fuel cell classifications may include, for example, metal hydride fuel cell, electro-galvanic fuel cell, direct formic acid fuel cell (DFAFC), direct carbon fuel cell, direct-ethanol fuel cell, direct-methanol fuel cell, reformed methanol fuel cell, regenerative fuel cell, microbial fuel cell, enzymatic biofuel cell, magnesium-air fuel cell, direct borohydride fuel cell, redox fuel cell (RFC), protonic ceramic fuel cell, direct ceramic fuel cell, tubular solid oxide fuel cell (TSOFC).

The present disclosure relates to the nature of the electrolyte system.

The present description relates to electrolytes in primary battery systems.

Electrolytes for primary batteries may be in liquid form. The liquid electrolyte may include, for example, aqueous, non-aqueous organics, or non-aqueous inorganics.

An aqueous liquid electrolyte may include an ammonium chloride solution as in the case of a Zinc-Carbon battery.

An aqueous liquid electrolyte may include a zinc chloride solution as in the case of a Zinc-Chloride battery.

An aqueous liquid electrolyte may include a silver chloride solution as in the case of a Magnesium battery.

An aqueous liquid electrolyte may include an alkali metal hydroxide solution such as potassium hydroxide or sodium hydroxide as in the case for Alkaline batteries, Silver-Oxide batteries, Mercury batteries, Nickel Oxyhydroxide batteries, Zinc-air batteries, and Aluminum-air batteries. In some instances the electrolyte may be in the form of seawater containing alkali metal hydroxides as in the case of Aluminum-air batteries.

A non-aqueous organic liquid electrolyte may include lithium perchlorate or lithium tetrafluoroborate dissolved in propylene carbonate as in the case of Lithium Carbon Monofluoride batteries, Lithium Iron Disulfide batteries, Lithium Manganese Dioxide batteries, and Lithium Copper Oxide batteries.

A non-aqueous inorganic liquid electrolyte may include lithium tetrachloroaluminate dissolved in thionyl chloride as in the case of Lithium Thionyl Chloride batteries.

The present description relates to electrolytes in secondary battery systems.

Secondary battery electrolytes may be in the form of, for example, liquid, polymer, gel polymer, solid-state ceramics, or ceramic-polymer composite.

The characteristics of a liquid electrolyte for a secondary battery system may include the following, and may have the nature of, for example, aqueous or organic.

An aqueous secondary battery electrolyte may include sulfuric acid as in the case of lead acid batteries.

An aqueous secondary battery electrolyte may include alkali metal hydroxide as in the case of Nickel Cadmium batteries, Nickel-Metal Hydride batteries, Silver-Zinc batteries, Nickel Iron batteries, Nickel Zinc batteries.

An aqueous secondary battery electrolyte may include a lithium, sodium, potassium, magnesium, aluminum, or iron salt dissolved in water to serve as an electrolyte for a metal-air batteries, wherein specifics of such an electrolyte and systems thereof are further described in the art.

An organic secondary battery electrolyte may be used in ion-based, metal-based, metal-based secondary batteries. Examples of organic based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

Organic-based secondary battery electrolytes may include and ionic conducting salt. Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato)borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$, $KNO_3$, $Al(NO_3)_2$, $AlCl_3$, $Al_2(SO_4)_3$, $AlBr_3$, $AlI_3$, AlN, AlSCN, $Al(ClO_4)_3$.

The characteristics of a polymer electrolyte for a secondary battery system may include the following. Polymer electrolytes may be used in, for example, ion-based, metal-based, metal-air secondary batteries.

Polymers for the crosslinked polymer matrix may be ionic conducting polymers or nonionic conducting polymers.

Examples of polymers included, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Polymer-based secondary battery electrolytes may include and ionic conducting salt. Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato)borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$, $KNO_3$, $Al(NO_3)_2$, $AlCl_3$, $Al_2(SO_4)_3$, $AlBr_3$, $AlI_3$, AlN, AlSCN, $Al(ClO_4)_3$.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

The characteristics of a gel polymer electrolyte for a secondary battery system may include the following. Gel polymer electrolytes may be used in, for example, ion-based, metal-based and metal-air secondary batteries.

A gel polymer electrolyte may be composed of, but not limited, a polymer matrix, an ionic conducting salt and a liquid based electrolyte.

Polymers for the crosslinked polymer matrix in a gel polymer electrolyte may be ionic conducting polymers or nonionic conducting polymers.

Examples of polymers include, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyamides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC (SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg (FSI) 2), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF 4) 2, Mg(PF$_6$)$_2$, Mg(NO$_3$)$_2$, Mg(CH$_3$COOH)$_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

Liquid based electrolytes in gel polymer electrolytes may include, for example organic based liquid electrolyte and ionic liquid electrolyte.

A gel polymer electrolyte may include an organic based liquid electrolyte. Examples of organic based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

A gel polymer electrolyte may include a room temperature ionic liquid electrolyte. Examples of room temperature ionic liquid electrolytes may include, for example, imidazolium, pyrrolidinium, piperidinium, ammonium, hexafluorophosphate, dicyanamide, tetrachloroaluminate, sulfonium, phosphonium, pyridinium, pyrazolium and thiazolium.

A gel polymer electrolyte may consist of a mixture of organic based liquid electrolyte and room temperature ionic liquid electrolyte.

The characteristics of a solid-state ceramic electrolyte may include the following. Solid-state ceramic electrolytes may be used in, for example, ion-based, metal-based and metal-air secondary batteries.

A solid-state ceramic electrolyte includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10_{-7}$ S/cm. It is preferably to have lower electronic conductivity ($<10^{-7}$ S/cm).

Examples of the solid-state ionic conductive material include for example a garnet-like structure oxide material with the general formula:

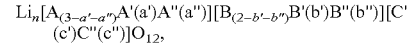

$$Li_n[A_{(3-a'-a'')}A'(a')A''(a'')][B_{(2-b'-b'')}B'(b')B''(b'')][C'(c')C''(c'')]O_{12},$$

a. where A, A', and A" stand for an dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'$, $0 \leq b''$, and $b' + b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n = 7 + a' + 2 \cdot a'' - b' - 2 \cdot b'' - 3 \cdot c' - 4 \cdot c''$ and $4.5 \leq n \leq 7.5$.

In another example, a solid-state ionic conductive material includes perovskite-type oxides such as (Li,La)TiO$_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_2^{-}-x^{2-}X_x^{-}$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^{-}=F^{-}$, $Cl^{-}$, $Br^{-}$, $I^{-}$, or a combination thereof; and x is in the range of $0 \le x \le 2$.

The characteristics of a ceramic-polymer composite electrolyte may include the following. Ceramic-polymer electrolytes may be used in, for example, ion-based, metal-based and metal-air secondary batteries.

A ceramic-polymer composite electrolyte may be composed of, for example, polymers, ionic conducting salt, ionic conductive ceramics, and nonionic conducting additives.

The polymer may be chemically stable with the ionic conductive ceramics. Alternatively, and in some instances, the polymer may chemically react with the ionic conductive ceramics to improve ionic conductivity.

Polymers for the crosslinked polymer matrix may be ionic conducting polymers or nonionic conducting polymers.

Examples of polymers included, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, LiC($SO_2CF_3$)$_3$, $LiN(SO_2CF_3)_2$), $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl)imide (Mg(FSI) 2), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$), $KNO_3$, $Al(NO_3)_2$, $AlCl_3$, $Al_2(SO_4)_3$, $AlBr_3$, $AlI_3$, AlSCN, $Al(ClO_4)_3$.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be >$10^{-7}$ S/cm. It is preferably to have lower electronic conductivity (<$10^{-7}$ S/cm).

Examples of the solid-state ionic conductive material include for example a garnet-like structure oxide material with the general formula:

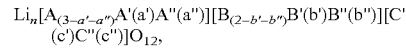

a. where A, A', and A" stand for an dodecahedral position of the crystal structure, i. where A stands for one or more trivalent rare earth elements, ii. where A' stands for one or more alkaline earth elements, iii. where A"

stands for one or more alkaline metal elements other than Li, and iv. wherein $0 \leq a' \leq 2$ and $0 \leq a'' \leq 1$;

b. where B, B', and B'' stand for an octahedral position of the crystal structure, i. where B stands for one or more tetravalent elements, ii. where B' stands for one or more pentavalent elements, iii. where B'' stands for one or more hexavalent elements, and iv. wherein $0 \leq b'$, $0 \leq b''$, and $b'+b'' \leq 2$;

c. where C' and C'' stand for a tetrahedral position of the crystal structure, i. where C' stands for one or more of Al, Ga, and boron, ii. where C'' stands for one or more of Si and Ge, and iii. wherein $0 \leq c' \leq 0.5$ and $0 \leq c'' \leq 0.4$; and d. wherein $n = 7 + a' + 2 \cdot a'' - b' - 2 \cdot b'' - 3 \cdot c' - 4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2+x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

The ionic conductive ceramics may have a weight content of 0.1 to 99.9% relative to the polymer content.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

The present description relates to electrolytes in an electrochemical capacitor.

Electrolytes is electrochemical capacitors may consist of a solvent and dissolved chemicals that dissociate into positive cations and negative anions, within said solvent. The solvent may be aqueous, organic, or an ionic liquid. The solvent may govern the parameters of an electrochemical capacitor. For instance, an aqueous electrolyte may be used for high power applications where energy density is not essential. In another instance, an ionic liquid electrolyte may be used for higher energy applications where power density is not as essential. In yet another instance, organic electrolytes may be used to provide moderate energy and power density.

Aqueous electrolytes may include, for example, sulfuric acid ($H_2SO_4$), alkali metals such as potassium hydroxide or sodium hydroxide, quaternary phosphonium salts, sodium perchlorate, lithium perchlorate, potassium chloride, sodium sulfite, sodium sulfate, or lithium hexafluoride arsenate.

Organic electrolytes may include an organic electrolyte and a salt. A typical organic solvent may include, for example, propylene carbonate, tetrahydrofuran, diethyl carbonate, or γ-butyrolactone. Salts may include, for example, quaternary ammonium salts, alkyl ammonium salts such as tetraethylammonium tetrafluoroborate (N(Et) or triethyl (methyl) tetrafluoroborate ($NMe(Et)_3BF_4$)

Ionic liquid electrolytes may include, for example, a room temperature ionic liquid electrolyte. Examples of room temperature ionic liquid electrolytes may include, for example, imidazolium, pyrrolidinium, piperidinium, ammonium, hexafluorophosphate, dicyanamide, tetrachloroaluminate, sulfonium, phosphonium, pyridinium, pyrazolium and thiazolium.

The present description relates to electrolytes in flow batteries.

Electrolytes in flow batteries may be referred to as ion-exchange, ion-selective, or ceramic ion-conducting membranes.

Membranes may be in the form of, for example, polymers, ceramic, or ceramic-polymer composites.

A polymer membrane may be composed of Nafion, or a sulfonated tetrafluoroethylene-based fluoropolymer-copolymer, in the case of an ion exchange membrane.

A polymer membrane may be composed of polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(m-ethylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Polymers specific to flow type batteries such as, for example, vanadium redox flow batteries, polysulfide redox flow batteries, uranium redox flow batteries, zinc-polyiodide redox flow batteries, zinc-bromide redox flow batteries, zinc-cerium redox flow batteries, zinc-bromide hybrid flow batteries, zinc-cerium redox flow batteries, organic redox flow batteries, metal hydride redox flow batteries, and non-structured redox flow batteries may be found elsewhere in the art.

A solid ion-conducting ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

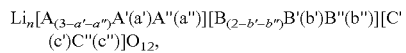

$$Li_n[A_{(3-a'-a'')}A'(a')A''(a'')][B_{(2-b'-b'')}B'(b')B''(b'')][C'(c')C''(c'')]O_{12},$$

a. where A, A', and A" stand for an dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \le a' \le 2$ and $0 \le a'' \le 1$;
b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \le b'$, $0 \le b''$, and $b'+b'' \le 2$;
c. where C' and C" stand for a tetrahedral position of the crystal structure, i. where C' stands for one or more of Al, Ga, and boron, ii. where C" stands for one or more of Si and Ge, and iii. wherein $0 \le c' \le 0.5$ and $0 \le c'' \le 0.4$; and
d. wherein $n=7+a'+2 \cdot a''-b'-2 \cdot b''-3 \cdot c'-4 \cdot c''$ and $4.5 \le n \le 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, e or a combination thereof; $X^-=F^-$, $Cl^-$, $Br^-$, $I^-$, or a combination thereof; and x is in the range of $0 \le x \le 2$.

The present description relates to electrolytes in fuel cells.

A fuel cell electrolyte may be composed of a polymer such as Nafion, or a sulfonated tetrafluoroethylene-based fluoropolymer-copolymer, in the case of a proton exchange membrane (PEM).

A fuel cell electrolyte may be composed of phosphoric acid as in the case of a phosphoric acid fuel cell (PAFC).

A fuel cell electrolyte may be composed of a solid acid such as cesium hydrogen sulfate ($CsHSO_4$) or dihydrogen phosphate ($CsH_2PO_4$), wherein the solid acid undergoes a phase transition to become a highly disordered superprotonic structure at elevated temperatures, in the case of a solid acid fuel cell (SAFC).

A fuel cell electrolyte may be alkali metal hydroxide aqueous solution such as potassium hydroxide or sodium hydroxide as in the case of an alkaline fuel cell (AFC).

A fuel cell electrolyte may be an oxygen ion conductive ceramic such a yttria-stabilized zirconia (YSZ) or cerium gadolinium oxide (CGO), as in the case of solid oxide fuel cells (SOFCs).

A fuel cell electrolyte may be a salt such as lithium potassium carbonate where in the salt is liquified at elevated temperatures, as in the case of molten-carbon fuel cell (MCFC).

The present disclosure relates to the inductively heatable materials embedded within the electrolyte.

Induction heating may be defined as a process by materials with induction heating properties are embedded or suspended within the electrolyte of an electrochemical cell and are heated by the generation of eddy currents using electromagnetic induction.

Induction materials embedded or suspended in the electrolyte of an electrochemical cell may include, for example, iron, steel, nickel, Zinc, cobalt, aluminum, copper, silicon, carbon, neodymium, manganese, ferrite, magnetite ($Fe_3O_4$), brass, silicon carbide, $Co_2Ba_2Fe_{12}O_{22}$, $SrFe_{12}O_{19}$, and the alloys and mixtures of them.

The present description relates to inductively heatable materials in the form of materials, or more small particles in the form of a powder or sphere like configuration.

Inductive heating materials may be suspended or dispersed in the electrolyte or formed within the electrolyte matrix.

Inductive heating materials may be suspended or dispersed in a precursor solution and then become part of the final electrolyte matrix, in the case of polymer, gel polymer, or ceramic-polymer composite electrolyte.

Inductive heating materials may be added to a ceramic mixture prior to the electrolyte formation, in the case of solid-state electrolytes or ceramic-polymer composite electrolytes.

Inductive heating materials may have a particle size in the range of $0<s<100$ µm, with a preferred range of $0<s<1$ µm.

Inductive heating materials may be commonly referred to as, for example, quantum dots, nano dots, powder, micro particles, flakes, spheres, microspheres, nanospheres, etc.

The inductive heating materials may be conformally coated with an insulating material such a polymer or an inorganic nonelectronic conductive material to form a core-shell structure. Coating thickness may be in the range of $0<t<1000$ nm, with a preferred range of $0<t<100$ nm.

Inductive heating materials may be suspended or dispersed by the use of a surfactant, in the case of liquid electrolytes. Liquid electrolytes may refer to aqueous or nonaqueous based electrolytes.

Surfactants may be anionic, cationic, nonionic, or amphoteric. Anionic surfactants may include, for example, sulfates ($C_nH_{2n+1}OSO_3^-Na^+$), sulfonates ($C_nH_{2n+1}SO_3H$), phosphates ($C_nH_{2n+1}OPO_3H_2$), carboxylates ($C_nH_{2n+1}COOH$). Cationic surfactants may include, for example, alkylammonium ($C_nH_{2n+1}(CH_3)NX$ [X=OH, Cl, Br, HSO$_4$]), dialkylammonium (($C_{16}H_{33})_2(CH_3)_2N^+Br^-$). Non-ionic surfactants may include, for example, primary amines ($C_nH_{2n+1}NH_2$), polyethylene oxides ($HO(CH_2CH_2O)_nH$).

The inductive heating materials may be located at the surface of the electrolyte and in contact with, for example, a separator, fabric substrate, negative electrode, or positive electrode.

The present disclosure relates to inductive heating materials supported or deposited on or in an electrochemical cell separator.

A separator is defined as a porous material that allows ions and liquid to pass through and not selective toward any ions.

Separator materials may include, for example, nonwoven fibers, such as cloth, nylon, polyester, glass fiber, glass mats, polymers, such as polyethylene, polypropylene, poly(tetrafluoroethylene, polyvinyl chloride, polyamide, polyolefin, polyacrylonitrile, cellulose, and natural materials, such as wood, rubber, and asbestos.

Inductive heating materials may be deposited onto, or within, a separator using methods such as, for example, drop casting, spin coating, spraying, tape casting, dip coating, evaporation, Langmuir-Blodgett, gel casting, chemical vapor deposition, physical vapor deposition, etc.

The inductive heating materials may be introduced into the separator production process so that the inductive heating materials are embedded in the separators.

Inductive heating materials deposited in or on a separator material may have a particle size in the range of $0<s<100$ µm, with a preferred range of $0<s<1$ µm.

The inductive heating materials deposited in or on a separator material may be commonly referred to as, for example, quantum dots, nano dots, powder, micro particles, etc.

The inductive heating materials deposed in or on a separator material may be conformally coated with an insulating material such a polymer or an inorganic nonelectronic conductive material to form a core-shell structure. Coating thickness may be in the range of $0<t<1000$ nm, with a preferred range of $0<t<100$ nm.

Inductive heating materials deposited in or on a separator material may be in contact with, for example, an electrolyte, negative electrode, positive electrode.

Alternatively, the inductive heating materials may be deposited onto a fabric support using methods such as, for example, drop casting, spin coating, spraying, tape casting, dip coating, evaporation, Langmuir-Blodgett, gel casting, chemical vapor deposition, physical vapor deposition, etc.

The present description relates to inductively heatable wires or fibers.

The electrolyte may contain one wire or fiber positioned on its surface or embedded within it.

The wire or fiber may be in the shape of, for example, spiral, curled, bent, straight or randomly orientated.

Alternatively, the electrolyte may contain multiple wires or fibers positioned on its surface or embedded within it.

The wires or fibers may be in the shape of, for example, spiral, curled, bent, straight or randomly orientated.

The wires or fibers may be orientated in the position of, for example, mesh, screen, woven, knitted, nonwoven or laid parallel to another other, or randomly orientated.

Wires or fibers may have a diameter in the range of $0<d<1$ mm with a preferred range of $0<d<100$ µm.

The diameter of the wires or fibers may be further defined by the American wire gauge with a range of $18<d<40$ AWG. The diameter of the wires or fibers may further exceed 40 AWG.

The wires or fibers may be commonly referred to as, for example, nanowires, nanofibers, microwires, microfibers, nanotubes, microtubes, multiwalled, single walled etc.

In the event that the wires or fibers are orientated on the surface of a polymer or solid-state electrolyte, they may be in contact with, for example, a liquid electrolyte, separator, fabric substrate, negative electrode, positive electrode.

The wires or fibers may not be in contact with both the negative and positive electrode simultaneously as to prevent short circuiting.

The wires or fibers may be conformally coated with an electronic insulating material such a polymer or an inorganic nonelectronic conductive material to form a core-shell structure. Coating thickness may be in the range of $0<t<1000$ nm, with a preferred range of $0<t<100$ nm.

The present disclosure relates to the induction heating system.

An induction heating system may be composed of an induction heating coil and induction heating materials embedded or suspended within the electrolyte of an electrochemical cell.

An alternating current is passed through an induction coil generating a magnetic field within and around said induction coil. The electrochemical cell may be located within the magnetic field. The magnetic field may generate eddy currents within induction heating materials embedded or suspended within the electrolyte. The generated eddy currents provide the localized heat necessary to raise the internal temperature of the electrolyte to facilitate ionic conduction in cold environment. In some instances, the induction heating may be used to melt to electrolyte components to enable operation at elevated temperatures. In yet another instance, induction heating may be used to heat up the electrolyte of an electrochemical cell to enable operation at high temperatures.

The present description relates to the nature of the induction heating coil.

The induction heating coil may also be referred to as the electromagnetic induction source.

Preferably the induction coil is made up of copper. Alternatively, materials may include, for example, aluminum, silver, gold, brass, nickel, tungsten, chromium, carbon etc.

The coil may be coated with an electronic insulating layer such as a transition metal oxide or a polymer. The insulating layer may have a thickness in the range of, for example, 0.01500 µm.

The present description relates to the position of the induction heating coil.

The induction heating coil may be located internally or externally of the electrochemical cell.

In the instance that the induction coil is located internally, the induction coil may be positioned inside the electrochemical cell, preferably on the casing of the electrochemical cell. Alternatively, the induction coil may be built into the electrochemical cell housing or casing system.

When located internally or within the electrochemical cell it is assumed that the alternating current would be generated externally of the electrochemical cell and delivered to the coil within the electrochemical cell through leads protruding from the electrochemical cell. It is preferred that the leads are specific to the induction heating system and not the convention direct current leads in batteries. Alternatively, and in some instance the alternating current may be generated using the electrochemical cells own energy.

An example may be fuel cells or a fuel cell stack where in a portion of the direct current generated in the fuel cells or fuel cell stack is converted to alternating current and delivered to the induction system.

In yet another example, the induction leads protruding from electrochemical cells such as batteries or electrochemical capacitors in a pack or module format are all connected in either series or parallel, and a single alternating current is delivered to all cells simultaneously. The alternating current may originate from an external power source or from a portion of the electrical energy released from the batteries or electrochemical capacitors.

In the instance that the induction coil is located externally of the electrochemical cell, the electrochemical cell is placed inside the induction coil. Alternatively, the electrochemical cell is position near the induction coil but not inside said coil. In this instance, the electrochemical cell is in the proximity of the induction coil and still within the generated magnetic field.

When located externally of the electrochemical cell it is assumed that the alternating current would be generated through an external source. Alternatively, and in some instance the alternating current may be generated using the electrochemical cells own energy.

The present description relates to the parameters of induction heating.

Induction heating system, or the alternating current, may have a frequency in the range of $0.05<f<250$ kHz, with a preferred range of $0.1<f<200$ kHz.

The alternating current may be pulsed at intervals with a duration in the range of $0.000001 \leq s \leq 10$ seconds, with a preferred range of $0.001 \leq s \leq 1$ seconds. Time between intervals may have a duration in the range of $0.001 \leq s \leq 1000$ s, with a preferred range of $1 \leq s \leq 100$ seconds.

It is assumed that pulsed alternating current, at longer durations, and with less time between the intervals, is used to heat up an electrochemical cell in cold environments to a desired temperature near ambient conditions.

It is assumed that pulsed alternating current, at shorter durations, and with more time between the intervals, is used to stabilize a temperature, and said temperature is near ambient conditions, wherein the electrochemical cell is in a cold environment.

It is assumed that pulsed alternating current at longer duration, and with more time between the intervals; or alternatively, shorter duration, and with less time between the intervals are used to heat up and maintain an electrochemical cell at elevated temperature above ambient conditions, wherein the electrochemical cell is in a cold environment.

Pulsed alternating current is assumed to be used as to not overheat or damage the electrochemical cell and the surrounding components. And that the pulsation of the alternating current is engineered and controlled to perform the specific function of the induction heating system without detrimental side effects to the electrochemical cell.

Alternatively, a continuous alternating current may be used. In this instance, it is assumed that the electrochemical cell must be maintained at a temperature well above ambient conditions. An example of an electrochemical cell may include a solid oxide fuel cell or SOFC in which the temperature above 800 degrees Celsius must be maintain. Another example of an electrochemical cell may include a molten-carbonate fuel cell (MCFC) or a molten-salt battery where in the electrolyte must be kept at an elevated temperature to remain in a molten state. Though these are only examples for the use of continuous alternating current, alternating current may be used for any other electrochemical cell when needed or desired. Vice versa, SOFC, MCFC, and molten-salt batteries may be heated using pulsed alternating current when needed or desired. It is assumed that the use of continuous current will not overheat or damage the electrochemical cell and the surrounding components.

It is assumed that the induction heating system is designed and engineered to specifically target the induction heating materials embedded or suspended in the electrolyte. Thus, the induction materials to be embedded or suspended, the frequency of the alternating current, the choice of continuous or pulsed, as well as the parameters thereof, are all chosen, designed, and engineered to target the embedded or suspended heating materials. Other components in the electrochemical cells such as the electrodes, both positive and negative, current collectors, tabs, packaging, bipolar plates, etc., may be heated as a byproduct of the induction heating system. However, it is assumed that they are not the target of the induction heating system.

It is further assumed that the induction heating system is designed and engineered as to not damage the other components of the electrochemical cell, or to deteriorate the electrochemical cell, or to result in the shortening of the life expectancy or performance of the electrochemical cell.

The drawings of the present disclosure further describes systems and methods of induction heating of inductively heatable materials embedded within the electrolyte of various electrochemical systems. In the drawings, reference is made to: 002 Induction heating material; 004 Induction heating material; 006 Insulative coating layer; 008 Surfactant; 010 Manganese dioxide/carbon paste positive electrode; 012 Zinc powder/gel negative electrode; 014 Potassium hydroxide with induction materials suspended within; 016 Porous separator; 018 Anode current collector; 020 Container; 022 Intercalation cathode material; 024 Positive electrode current collector; 026 Intercalation anode material; 028 Negative electrode current collector; 030 Polymer electrolyte with induction materials suspended within; 032 Porous fuel cell anode; 034 Anode catalyst; 036 Porous fuel cell cathode; 038 Cathode catalyst; 040 Phosphoric acid with induction materials suspended within; 042 Hydrogen gas; 044 Excess hydrogen gas; 046 Oxygen gas; 048 Excess oxygen gas plus water byproduct; 050 Cathode current collector or bipolar plate; 052 Anode current collector or bipolar plate; 054 Flow battery cell reactor; 056 Catholyte tank; 058 Anolyte tank; 060 Lithium intercalation cathode material; 062 Lithium intercalation anode material; 064

Pump; 066 Lithium-based liquid electrolyte with induction materials suspended within; 068 Induction heating material; 070 Porous separator with induction heating material deposited on to the surface; 072 Porous separator with induction heating material embedded within; 074 Porous separator with induction heating materials on the surface and embedded within; 076 Cross section view of induction heating material; 078 Cross section view of wire or fiber; 080 Insulative coating layer; 082 Planar view of induction heating material; 084 Zinc anode; 086 Manganese dioxide cathode; 088 Carbon rod current collector; 090 Embedded induction heating wire or fiber; 092 Ammonium chloride electrolyte; 094 Molten sodium anode; 096 Nickel cathode; 098 Beta alumina; 100 Molten sodium tetrachloroaluminate; 102 Current collector; 104 Proton exchange membrane; 106 Catholyte tank; 108 Anolyte tank; 110 Ion conducting membrane; 112 Porous flow battery anode; 114 Porous flow battery cathode; 116 Catholyte; 118 Anolyte; 120 Lithium metal; 122 Porous lithium-air battery cathode; 124 Catalyst; 126 Lithium-air battery electrolyte; 128 Induction heating mesh; 130 Composite cathode; 132 Ceramic-polymer composite electrolyte; 134 Yttria-stabilized zirconia (YSZ); 136 Excess oxygen gas; 138 Excess hydrogen gas plus water byproduct; and 140 Ion conducting solution.

FIG. 1A schematic illustration of inductively heatable materials suspended in liquid-based electrochemical cell. An electrochemical cell may include a primary battery such as an Alkaline battery, wherein the inductive heating materials (002) are suspended in a potassium hydroxide solution and composed of an induction heating material (004) coated with an insulative layer (006) and enclosed within a surfactant (008). The alkaline battery may include a zinc powder/gel anode (012) coated on an anode current collector (018) and a manganese dioxide/carbon paste cathode (010) coated onto the container (020), which are separated by porous separator (016) and potassium hydroxide solution with induction heating materials suspended within (014).

Figure 2:
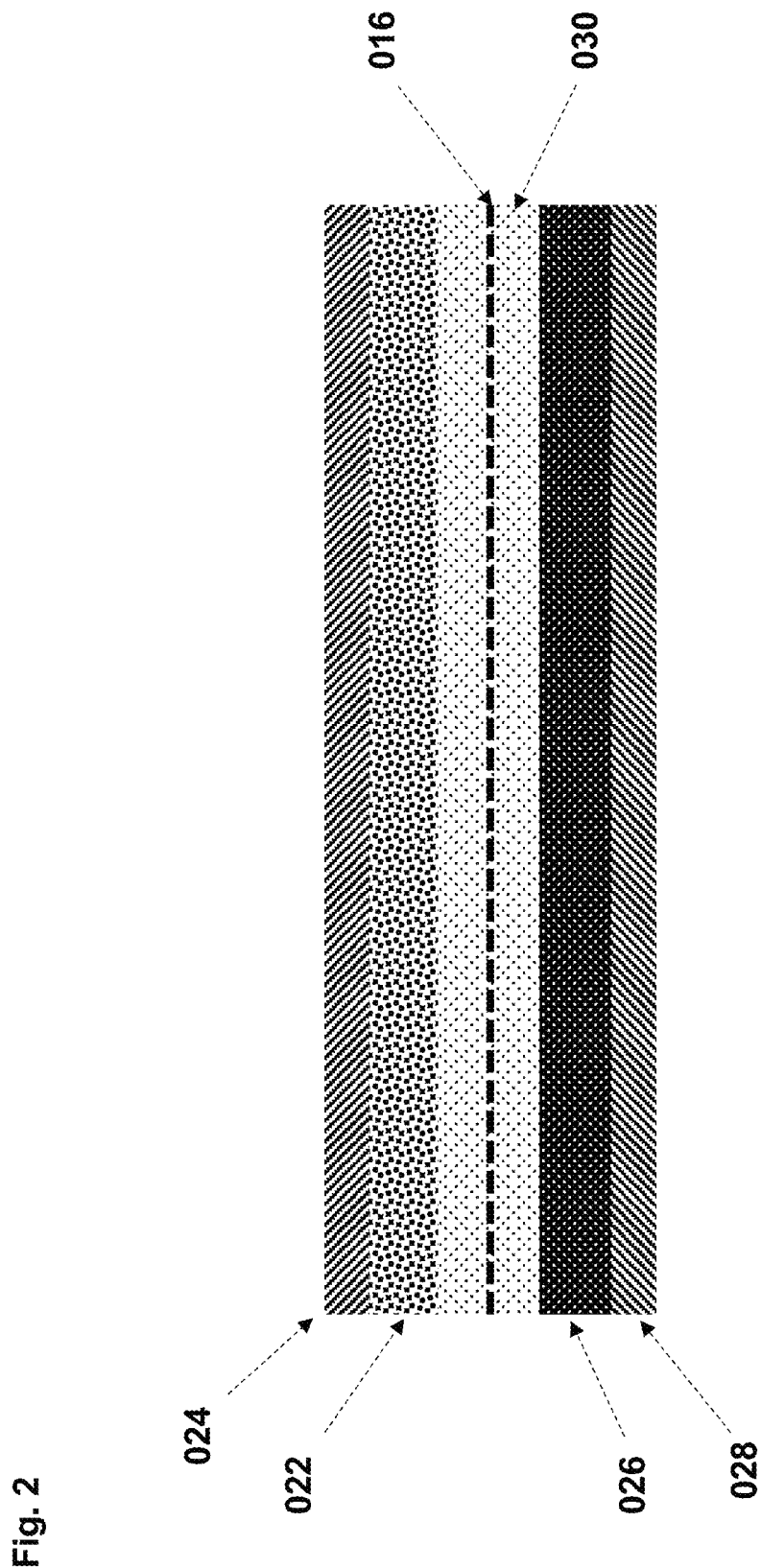
FIG. 2: A schematic illustration of inductively heatable materials suspended in the solid polymer electrolyte of a solid-state lithium-ion battery.

FIG. 2: A schematic illustration of inductively heatable materials suspended in a solid-state electrochemical cell. An electrochemical cell may include an ion-based secondary lithium battery wherein the inductive heating materials are suspended in a solid polymer electrolyte (030). The lithium battery may be composed of a lithium intercalation cathode material (022) coated on a positive electrode current collector (024) and a lithium intercalation anode material (026), such as graphite, coated on a negative electrode current collector (028). In the event that the polymer electrolyte is a gel polymer electrolyte, a porous separator (016) may be used to separate the positive and negative electrodes.

Figure 3:
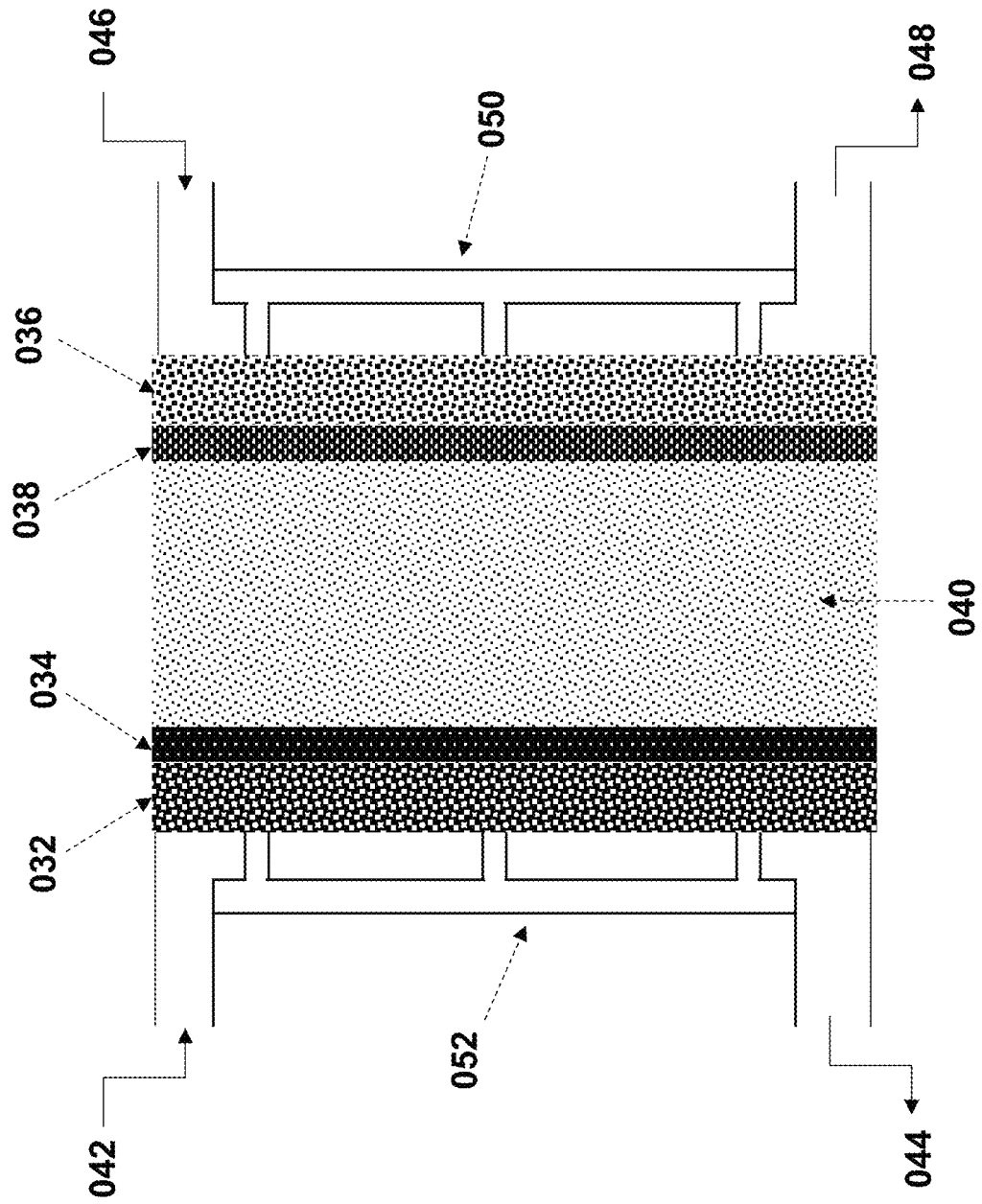
FIG. 3: A schematic illustration of inductively heatable materials suspended in the ion exchange electrolyte of a phosphoric acid fuel cell.

FIG. 3: A schematic illustration of inductively heatable materials suspended in a fuel cell ion exchange electrolyte. A fuel cell system may include a phosphoric acid fuel cell (PAFC). A PAFC may consist of phosphoric acid as the ion exchange media with induction materials suspended within (040). A PAFC may further consist of a porous fuel cell anode (032), coated with an anode catalyst (034), and a porous fuel cell cathode (036), coated with a cathode catalyst (038), separated by the phosphoric acid. A porous fuel cell anode (032) may be in electrical contact with an anode current collector or bipolar plate (052), and a porous fuel cell cathode may be in electrical contact with a cathode current collector or bipolar plate (050). Hydrogen gas (042) may enter the fuel cell on the anode side of said fuel cell. Oxygen gas (046) may enter the fuel cell on the cathode side of said fuel cell. Hydrogen gas (042) that is not dissociated may exit the fuel cell as excess hydrogen gas (044). After the reaction of hydrogen gas and oxygen gas at the cathode catalyst, water as a byproduct may exit the fuel cell along with excess oxygen gas (048).

Figure 4:
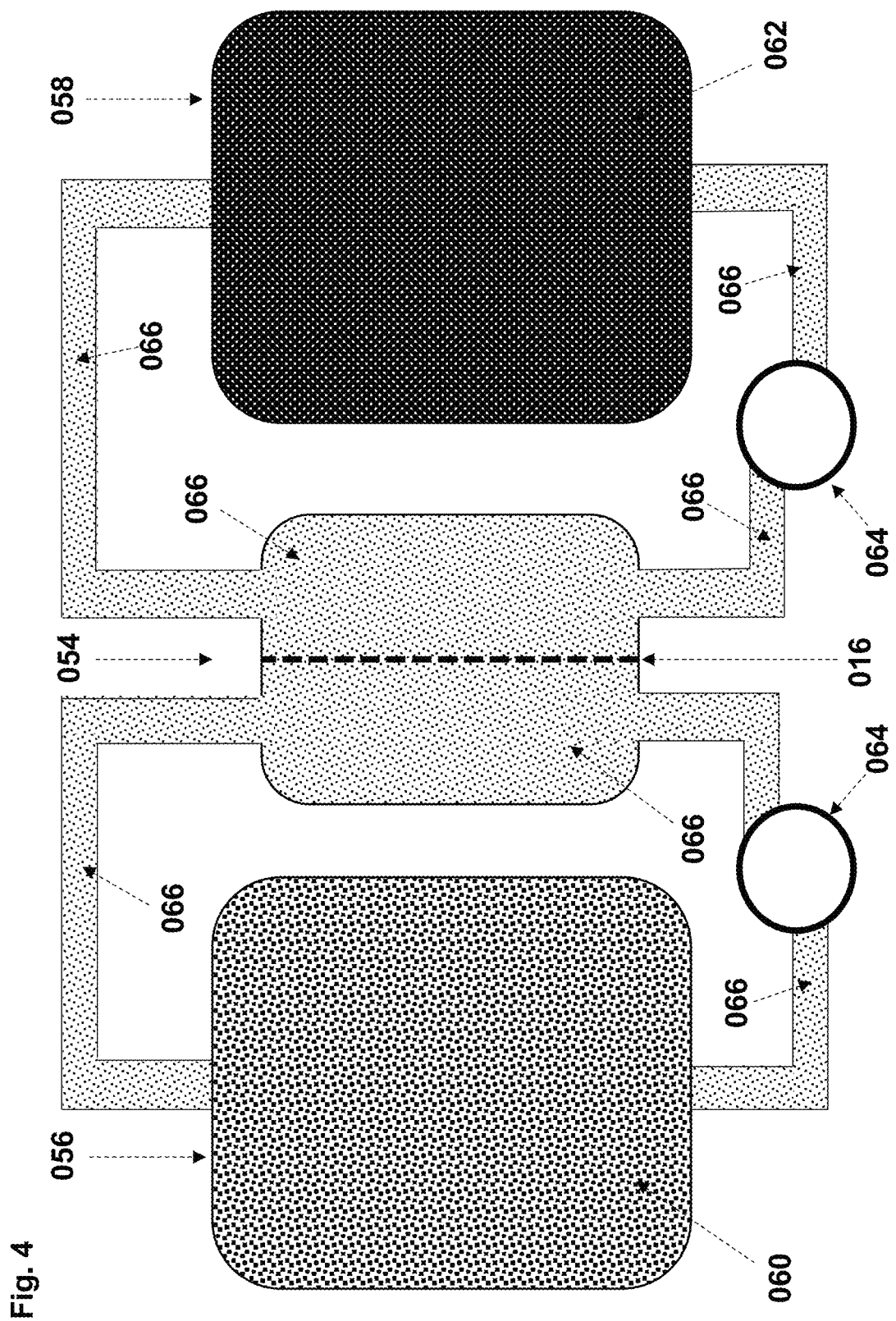
FIG. 4: A schematic illustration of inductively heatable materials suspended in the liquid electrolyte of a lithium-based semi-solid flow battery.

FIG. 4: A schematic illustration of inductively heatable materials suspended in a flow battery ionic conductive membrane, wherein the flow battery may be further defined as a semi-solid flow battery, and the ionic conductive membrane further defined as lithium-based liquid electrolyte with induction heating materials suspended within (066). The semi-solid flow battery may consist of a flow battery cell reactor (054), a catholyte tank (056), with a lithium intercalation cathode material (060) positioned within, and an anolyte tank (058), with a lithium intercalation anode material (062) positioned within. A flow battery cell reactor (054) may include a porous separator (016) to allow the lithium-based liquid electrolyte with induction heating materials suspended within (066) to flow from tank to tank but prevent the intercalation materials (060 and 062) from crossing over. Two pumps (064) may be used on each side of the semi-solid flow battery to push or pump the lithium-based liquid electrolyte with induction heating materials suspended within (066) through said semi-solid flow battery.

Figure 5:
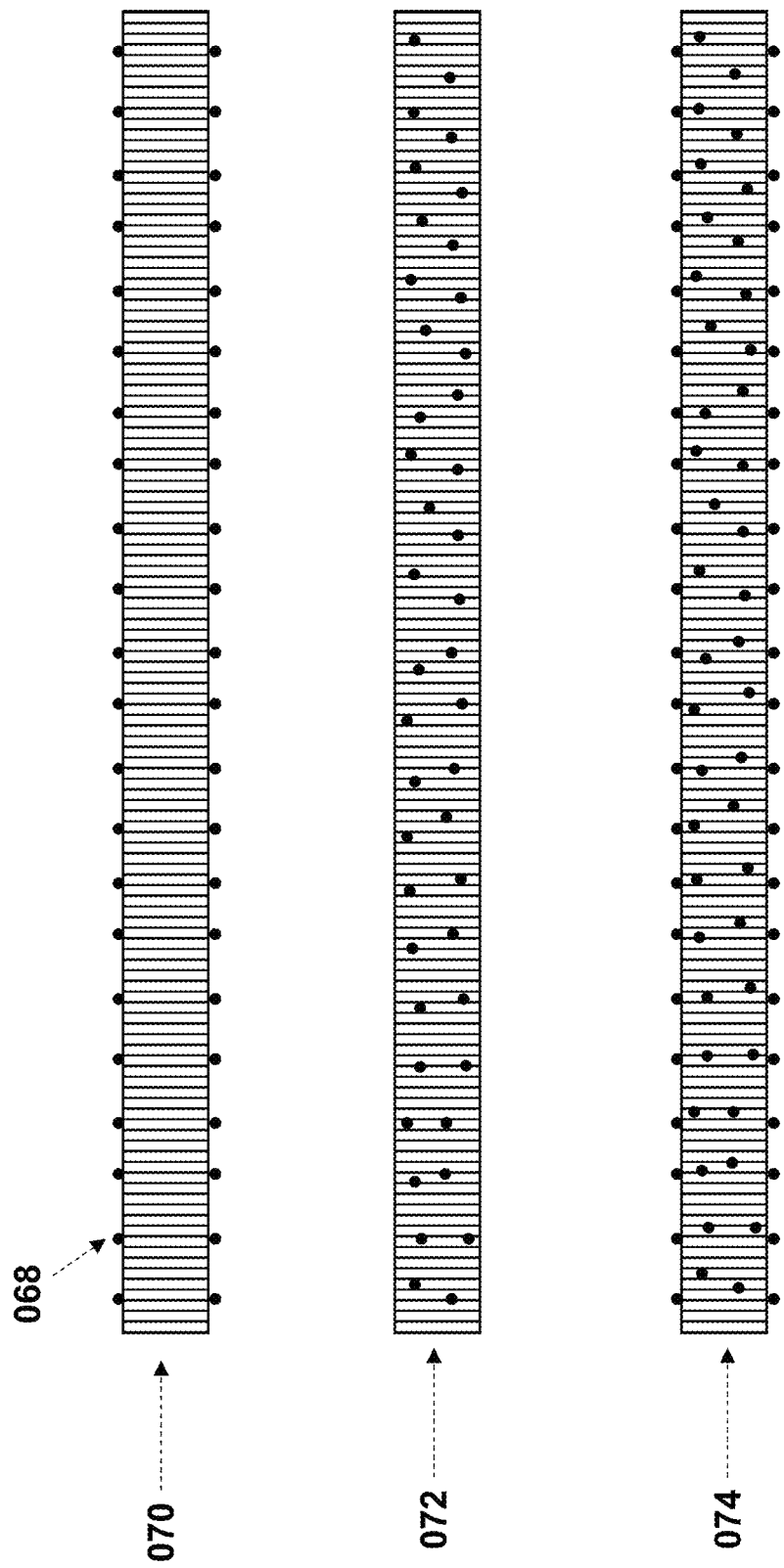
FIG. 5: A schematic illustration of inductively heatable materials embedded and/or dispersed on a battery separator.

FIG. 5: A schematic illustration of inductively heatable materials embedded or dispersed on to a battery separator. In an instance, induction heating materials (068) may be dispersed or coated onto a porous separator to form a porous separator with induction heating materials deposited onto the surface (070). In another instance, induction heating materials (068) may be embedded within the porous separator, wherein the induction heating materials (068) may be added to the mixture in the formation of a porous separator, to form a porous separator with induction heating material embedded within (072). In yet another instance, a porous separator may have induction heating materials (068) deposited onto the surface and embedded within (074).

FIG. 6: A schematic illustration of an inductively heatable wires or fibers embedded in a liquid-based electrochemical cell. An electrochemical cell may include a primary battery such as a Zinc-Carbon battery, wherein the inductive heating materials (090) are suspended or embedded in a ammonium chloride solution (092) and composed of an induction heating wires or fibers (078) coated with an insulative layer (080). The wires or fibers may be viewed cross sectionally (076) or from the planar view (082). The Zinc-Carbon battery may include a manganese dioxide cathode (086) coated on carbon rod current collector (088), and a zinc anode (084) coated onto the container (020), which are separated by porous separator (016) and ammonium chloride solution (092) with induction heating wires or fibers suspended or embedded within (090).

Figure 7:
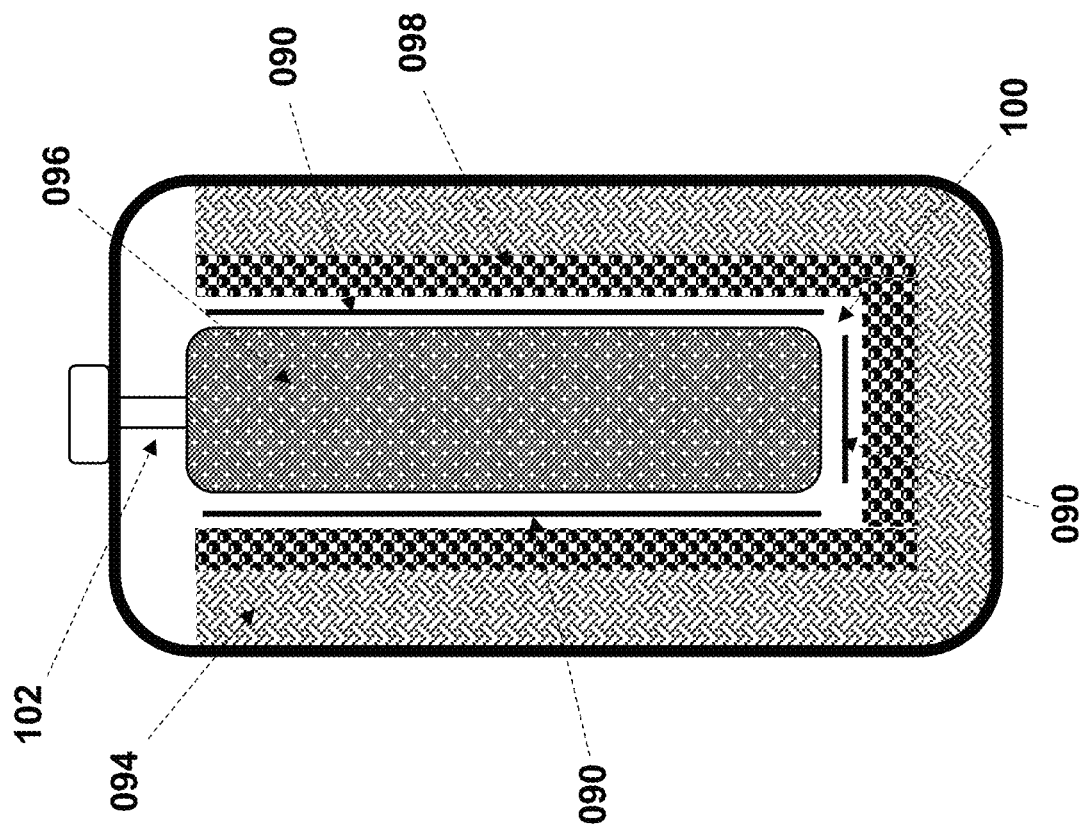
FIG. 7: A schematic illustration of inductively heatable wires or fibers embedded in a solid-state electrochemical cell such as a molten-salt battery or Zebra battery wherein it is in a solid state at room temperature, but in a molten state at elevated temperatures.

FIG. 7: A schematic illustration of an inductively heatable wires or fibers embedded in a solid-state electrochemical cell. An electrochemical cell may include a molten battery such as a sodium-nickel chloride or Zebra battery that is solid at room temperature but molten at elevated temperatures. At elevated temperatures, a Zebra battery may include a molten sodium anode (094), a nickel cathode (096) coated on a current collector (102), which are separated by a ceramic beta alumina (098) layer and a molten sodium tetrachloroaluminate (100). The wires or fibers (90) may be posited onto the surface of beta alumina (098), embedded in the beta alumina (098), or suspend in the molten sodium tetrachloroaluminate (100).

Figure 8:
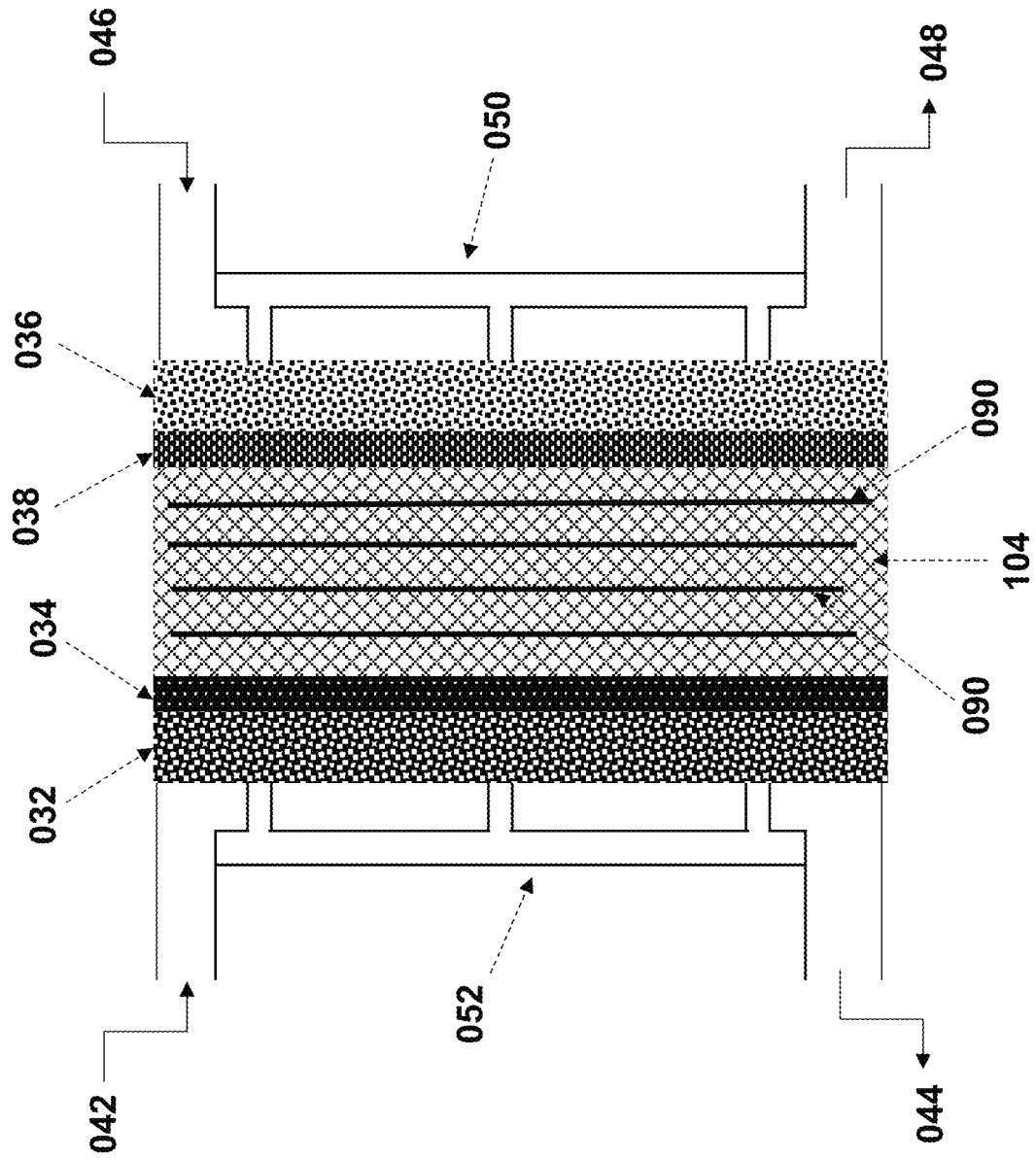
FIG. 8: A schematic illustration of inductively heatable wires or fibers embedded in the ion conducting membrane of a proton exchange membrane fuel cell.

FIG. 8: A schematic illustration of an inductively heatable wires or fibers embedded in a fuel cell proton exchange membrane, wherein the fuel cell is a proton exchange membrane fuel cell or PEMFC, wherein the proton exchange membrane (104) is composed of Nafion with induction heating wires or fibers embedded (090) within. A PEMFC may be may further consist of a porous fuel cell anode (032), coated with an anode catalyst (034), and a porous fuel cell cathode (036), coated with a cathode catalyst (038), separated by Nafion. A porous fuel cell anode (032) may be in electrical contact with an anode current collector or bipolar plate (052), and a porous fuel cell cathode may be in electrical contact with a cathode current collector or bipolar plate (050). Hydrogen gas (042) may enter the fuel cell on the anode side of said fuel cell. Oxygen gas (046) may enter the fuel cell on the cathode side of said fuel cell. Hydrogen gas (042) that is not dissociated may exit the fuel cell as excess hydrogen gas (044). After the reaction of hydrogen gas and oxygen gas at the cathode catalyst, water as a byproduct may exit the fuel cell along with excess oxygen gas (048).

Figure 9:
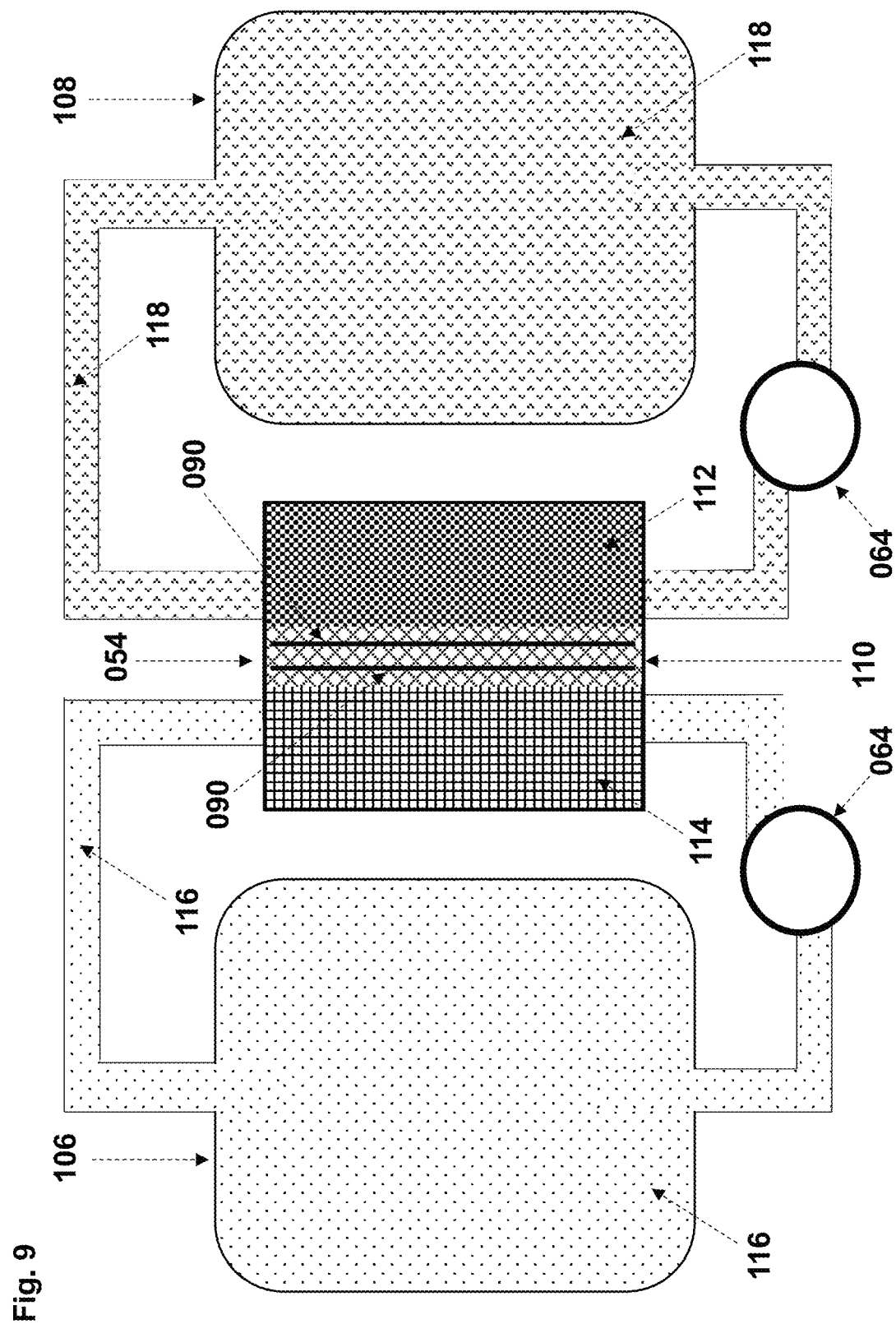
FIG. 9: A schematic illustration of inductively heatable wires or fibers embedded in ionic conductive membrane of a redox type flow battery.

FIG. 9: A schematic illustration of an inductively heatable fiber or wire embedded in a flow battery ionic conductive membrane, wherein the flow battery may be further defined as redox flow battery, and the ionic conductive membrane further defined as an ion selective membrane (110) with induction heating wires or fibers embedded within (090). A redox flow battery may consist of a flow battery cell reactor (054) which houses a porous cathode (114) on the catholyte side, a porous anode (112) on the anolyte side, separated by an ion selective membrane (110) with induction heating wires or fibers embedded within (090) that is used to prevent the mixing of the catholyte (116) and anolyte (118). A redox flow battery may further consist of a catholyte tank (106), which is used to store the catholyte (116), and an anolyte tank (108), which is used to store the analyte (118). A pump (064) may be used to push or pump the catholyte (116) through the redox flow battery and into the cell reactor. A second pump (064) may be used to push or pump the anolyte (118) through the redox flow battery and into the cell reactor.

Figure 10:
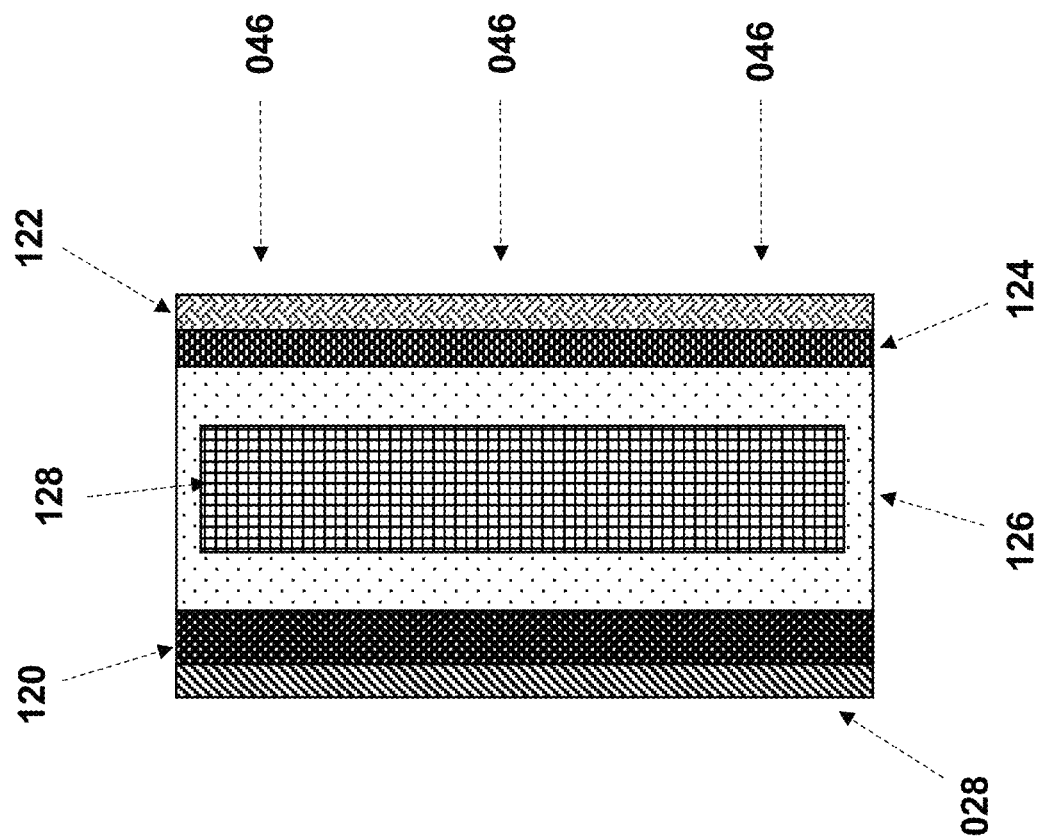
FIG. 10: A schematic illustration of an inductively heatable mesh embedded in the liquid electrolyte of a lithium-air battery.

FIG. 10: A schematic illustration of an inductively heatable mesh embedded in a liquid-based electrochemical cell. An electrochemical cell may include a lithium-air battery wherein air or oxygen gas (046) is used as an oxidizing agent. A lithium-air battery may be composed of a porous air-battery cathode (122), with a catalyst (124) coated on top, and a lithium metal anode (120), coated onto a negative electrode current collector (028), which are separated by a lithium-based liquid electrolyte (126), with an induction heating mesh (128) embedded within.

Figure 11:
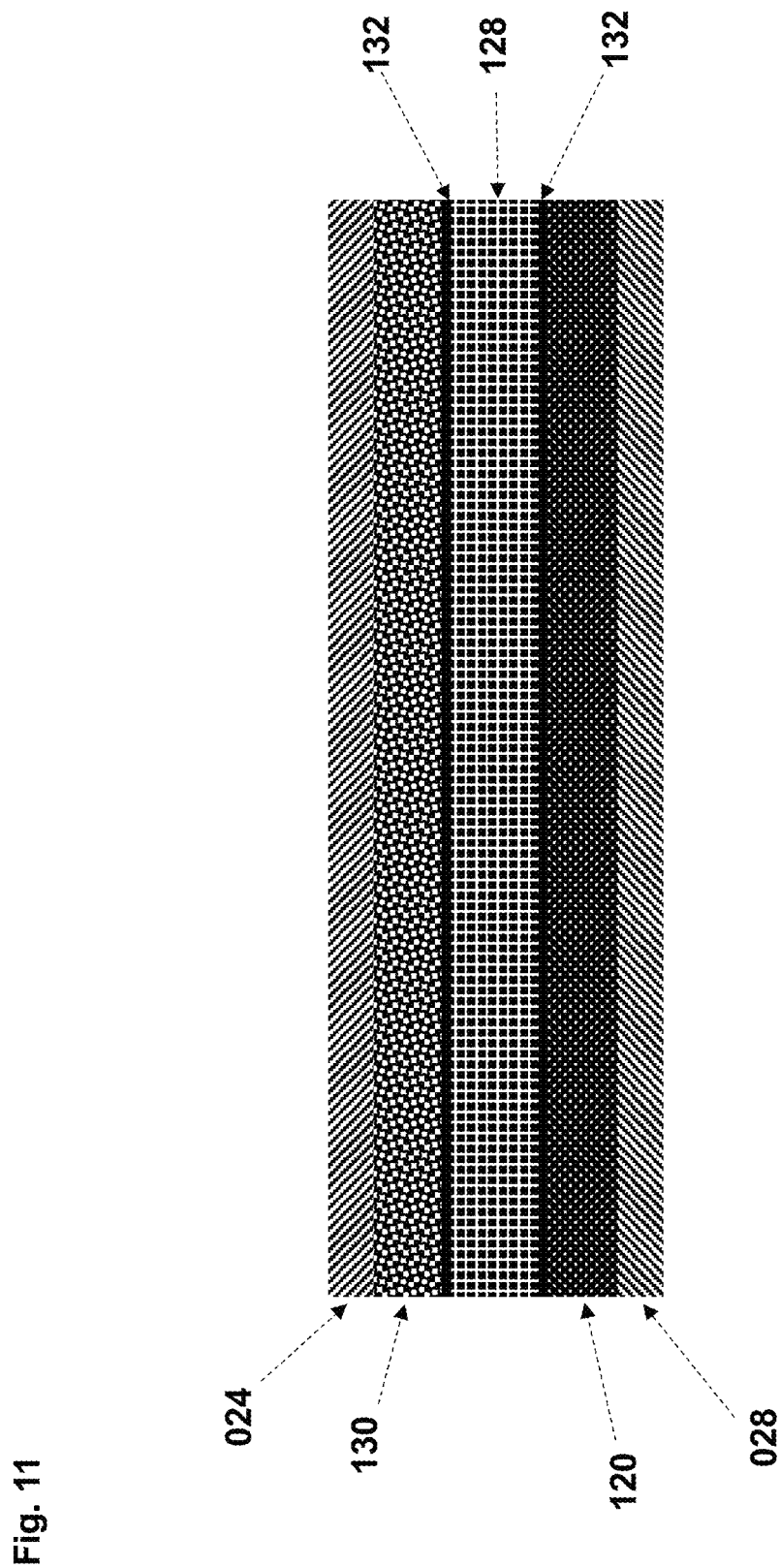
FIG. 11: A schematic illustration of an inductively heatable mesh embedded in the ceramic-polymer composite electrolyte of a solid-state lithium metal battery.

FIG. 11: A schematic illustration of an inductively heatable mesh embedded in a solid-state electrochemical cell. An electrochemical cell may include a metal-based secondary battery with a ceramic-polymer composite electrolyte (132), wherein the metal-based secondary battery is a solid-state lithium metal battery. A metal-based battery may consist of a composite cathode (130), coated on a positive electrode current collector (024), and a metal anode such as lithium metal (120), coated on a negative electrode current collector (028), separated by a ceramic-polymer composite electrolyte (132) embedded in an inductively heatable mesh (128). In this instance, the ceramic-polymer composite electrolyte (132) is assumed to be embedded in the pores of the heatable mesh (128), and vice versa the inductively heatable mesh embedded in the ceramic-polymer composite electrolyte (132) matrix. In such an instance, it is further assumed that the ceramic-polymer composite electrolyte (132) is coated onto and pressed into the heatable mesh which is expected to be coated with an electronic insulating layer.

Figure 12:
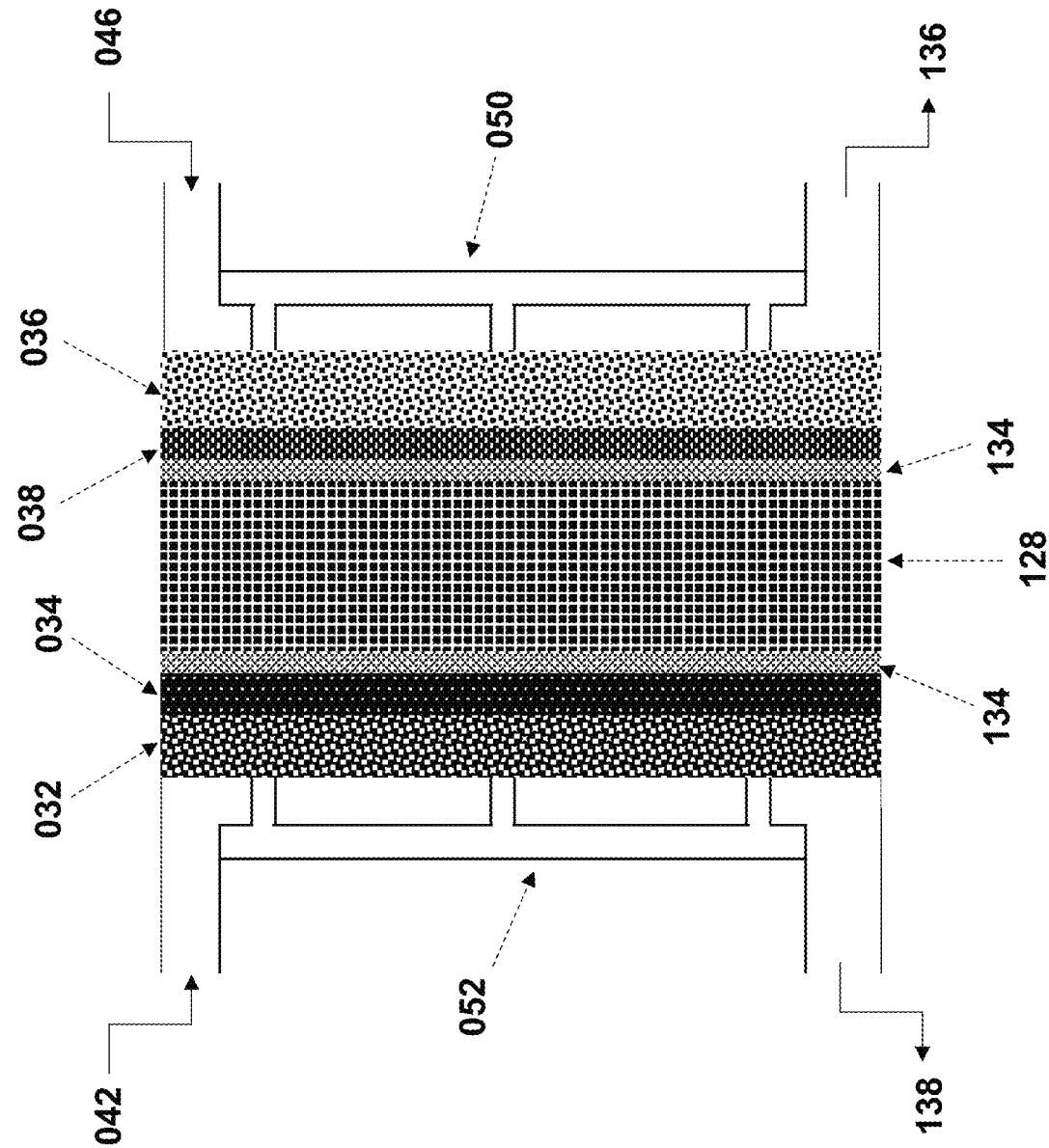
FIG. 12: A schematic illustration of an inductively heatable mesh embedded in the ceramic ionic conducting membrane of a solid oxide fuel cell.

FIG. 12: A schematic illustration of an inductively heatable mesh embedded in a fuel cell ion conducting membrane, wherein the fuel cell is a solid oxide fuel cell (SOFC) and the ion conducting membrane is ceramic yttria-stabilized zirconia (134) with an inductively heatable mesh (128) embedded within. A SOFC may further consist of a porous fuel cell anode (032), coated with an anode catalyst (034), and a porous fuel cell cathode (036), coated with a cathode catalyst (038), separated by yttria-stabilized zirconia (134). A porous fuel cell anode (032) may be in electrical contact with an anode current collector or bipolar plate (052), and a porous fuel cell cathode may be in electrical contact with a cathode current collector or bipolar plate (050). Hydrogen gas (042) may enter the fuel cell on the anode side of said fuel cell. Oxygen gas (046) may enter the fuel cell on the cathode side of said fuel cell. Oxygen gas (046) that is not dissociated may exit the fuel cell as excess oxygen gas (136). After the reaction of oxygen gas and hydrogen gas at the anode catalyst, water as a by product may exit the fuel cell along with excess hydrogen gas (138).

Figure 13:
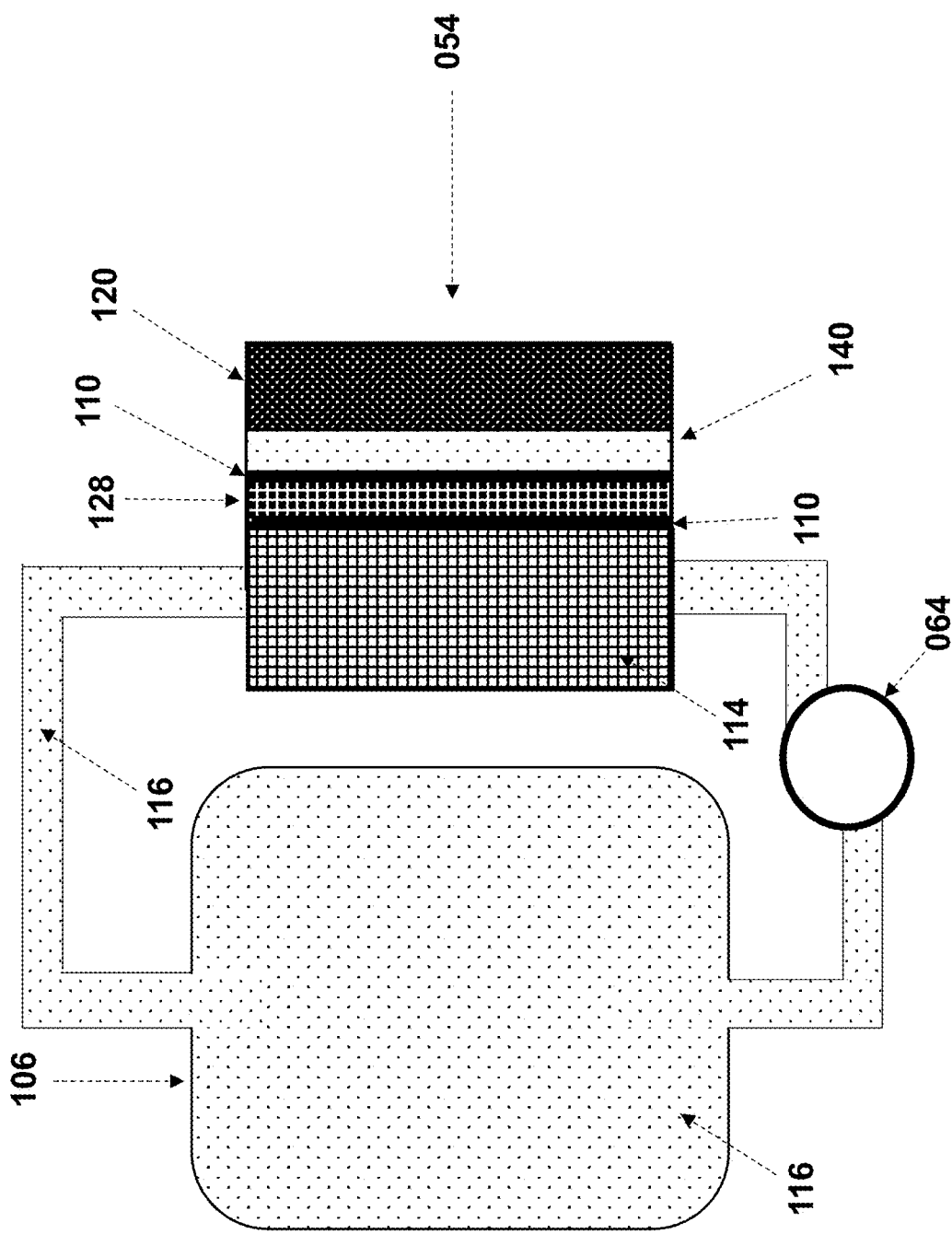
FIG. 13: A schematic illustration of an inductively heatable mesh embedded in the ionic conductive membrane of a hybrid type flow battery.

FIG. 13: A schematic illustration of an inductively heatable mesh embedded in a flow battery ionic conductive membrane, wherein the flow battery is a hybrid flow battery. A hybrid flow battery may be comprised of a catholyte tank (106), which is used to store the catholyte (116), and a flow battery reactor cell (054). A flow battery reactor cell (054) may be composed of a porous cathode (114) and a lithium metal anode (120), which are separated by an ionic conducting membrane (110) with an induction heating mesh (128) embedded within. An ion conducting solution (140) may be used between the ionic conducting membrane (110) and lithium metal (120) as an ion conducting media in order to facilitate ion conduction on the anolyte side of the flow battery. A pump (064) may be used to push or pump the catholyte (116) from the catholyte tank (106) to the reactor cell (054) and vice versa.

With reference to the drawings, examples of electrochemical energy storage systems with inductively heatable materials embedded or suspended in the electrolyte may include the following.

Example 1: In an example, induction heatable materials may be suspended in the liquid electrolyte of a primary battery cell. A primary battery cell may include, for example, an Alkaline battery, wherein the induction heating materials are suspended in a potassium hydroxide solution and composed of an induction heating material coated with an insulative layer and enclosed within a surfactant. The alkaline battery may include a zinc powder/gel anode coated on an anode current collector and a manganese dioxide/carbon paste cathode coated onto the container, which are separated by porous separator and potassium hydroxide solution with induction heating materials suspended within.

An alternative example may include, for example, silver oxide primary battery cells with induction heating materials supported in a sodium hydroxide solution separating an amalgamated zinc gel anode and silver oxide paste cathode.

An alternative example may include, for example, lithium primary battery cells where the induction heating materials are suspended in an organic solution positioned between a lithium metal anode and a variety of cathodes depending on the type of lithium battery.

Example 2: In an example, induction heatable materials may be suspended in the liquid electrolyte of a secondary battery cell. A secondary battery cell may include, for example, a lead acid battery wherein the induction heating materials are suspended in a solution of sulfuric acid and composed of an induction heating material coated with an insulative layer and enclosed within a surfactant. The lead acid cell may contain one lead plate and one lead oxide plate when in the charged state.

An alternative example may include, for example, a secondary Lithium ion battery cell wherein the induction heating materials are suspended in an organic solution positioned between a lithium intercalation cathode, such as $LiCoO_2$, and a lithium intercalation anode, such as graphite.

Yet another example may include, for example, a secondary Nickel-metal hydride battery cell wherein the induction heating materials are suspended in an potassium hydroxide solution between a nickel oxide hydroxide cathode and a hydrogen absorbing alloy in the $AB_5$, in other instances an $AB_2$ group.

Example 3: In an example, induction heatable materials may be deposited onto, embedded within, or in some instances embedded within and deposited onto a porous battery separator. An porous battery separator may include, for example, a glass mat for a lead acid battery. An alternative example may include, for example, a polypropylene separator for primary lithium batteries. Yet another example may include, for example, polyolefin in secondary lithium ion batteries.

Example 4: In an example, induction heatable materials may be suspended in the liquid electrolyte of an electrochemical capacitor. An example of an electrochemical capacitor may include, for example, an electric double layer capacitor wherein the inductive heating materials are suspended in a potassium chloride solution between positive and negative electrodes composed of activated carbon.

In alternative example may include, for example, pseudocapacitors where the induction heating materials are suspended in a sulfuric acid solution, wherein the positive and negative electrodes are metal oxide such as ruthenium oxide, or in some cases a metal oxide such as ruthenium oxide anchored onto a carbon structure. Alternatively, the positive and negative electrodes may be an electrically conducting polymer such as, for example, poly(3,4-ethylenedioxythiophene).

In yet another example may include, for example, asymmetric supercapacitors where the induction heating materials are suspended in a lithium hydroxide solution, wherein the negative electrode is a carbon material such as activated carbon, and the positive electrode is a metal oxide, such as cobalt molybdate ($CoMoO_4$).

Example 5: In an example, induction heating materials may be suspended in the matrix of a solid polymer in an ion-based battery. An example of an ion-based battery may include, for example, a lithium polymer battery, wherein the induction heating materials are suspended in a poly(ethylene oxide) (PEO) matrix between a lithium intercalation anode, such as graphite, and a lithium intercalation cathode, such as lithium iron phosphate ($LiFePO_4$).

Example 6: In an example, induction heating materials may be suspended in a gel polymer electrolyte, wherein the induction heating materials are suspended in a solid polymer, such as, for example, polyacrylonitrile, and an organic liquid electrolyte, such as, for example, ethylene carbonate with one molar of lithium hexafluorophosphate. The gel polymer may be used in a lithium-ion battery composed of, for example, an intercalation cathode, such as $LiNi_x Co_y Mn_z O_2$, and an intercalation anode, such as graphite composed of 10-15% silicon particles by weight.

Example 7: In an example, induction heating materials may be suspending in an ionic conducting solution, wherein the ionic conducting solution serves as the ionic conducting media for a fuel cell. A fuel cell may include, for example, a phosphoric acid fuel cell (PAFC), wherein the induction heating materials are suspended in phosphoric acid. A PAFC may be composed of porous carbon paper as the electrodes, wherein platinum is used as the catalyst on the anode side, and nickel as the catalyst on the cathode side. The induction heating materials may be used to increase the ionic conductivity of the phosphoric acid in cold weather. In addition, the induction heating materials may be used to maintain the high temperature of the PAFC in the preferred temperate range of 150 to 200 degrees Celsius. In addition, the induction heating materials may be used to lower the startup time of the PAFC.

An alternative example may include, for example, an alkaline fuel cell (AFC), wherein the induction heating materials are suspended in a concentrated solution of sodium hydroxide, or in some cases potassium hydroxide. The AFC, also referred to as a hydrogen-oxygen fuel cell, may be composed of porous carbon materials as the electrodes, wherein platinum is used as the catalyst on the anode side, and nickel as the catalyst on the cathode side. The induction heating materials may be used to increase the ionic conductivity of the concentrated sodium hydroxide solution in cold weather. In addition, the induction heating materials may be used to maintain the operating temperature of the AFC in the preferred temperate range of 70 to 140 degrees Celsius. In addition, the induction heating materials may be used to lower the startup time of the AFC.

Example 8: In an example, induction heating materials may be suspended in the ionic conducting media of a flow battery, wherein the flow battery may be a semi-solid flow battery. The induction heating materials may be suspended in the liquid electrolyte of a semi-solid flow battery. An example of a semi-solid flow battery may include, for example, a lithium-based solid dispersion flow battery, wherein lithium intercalation materials are suspended in the ionic conduction solution which may be organic based consisting of ethylene carbonate and lithium hexafluorophosphate. The lithium intercalation materials may include lithium iron phosphate ($LiFePO_4$) on the catholyte side, and graphite on the analyte side. A porous separate may be positioned inside the flow battery cell reactor to prevent mixing of the intercalation materials, but allow ions, electrolyte, and the suspended induction heating materials to flow through.

An alternative example of a semi-solid flow battery may include, for example, a redox targeting flow battery, wherein the induction heating materials are suspended in the liquid electrolyte, but the intercalation materials are fixed in the catholyte and anolyte tanks. The catholyte tank may contain lithium iron phosphate ($LiFePO_4$) fixed within, while the analyte tank may contain graphite fixed within.

Example 9: In an example, induction heating wires or fibers, coated with a thin electronic insulating layer, may be embedded, or suspended in the liquid electrolyte of a primary battery. A primary battery may include, for example, a Zinc-carbon battery, wherein the induction heating wires or fibers are suspended in an ammonium chloride solution serving as the electrolyte, separating a manganese dioxide cathode, coated on a carbon rod current collector, and metallic zinc serving as both the anode and container.

An alternative example of a primary battery may include, for example, a Zinc-chloride battery, wherein the induction heating wires, or fibers are embedded or suspend in a zinc chloride solution separating a manganese dioxide cathode, coated on a carbon rod current collector, and metallic zinc serving as both the anode and container.

Example 10: In an example, induction heating wires or fibers may be embedded in the electrolyte of a molten-salt battery. A molten-salt battery may include, for example, a sodium-nickel chloride or Zebra battery, wherein the electrolyte is a solid at room temperature but molten at elevated temperatures. At elevated temperatures, a Zebra battery may include a molten sodium anode, a nickel cathode coated on a current collector, which are separated by a ceramic beta alumina layer separator layer and a molten sodium tetrachloroaluminate. The induction heating wires, or fibers may be posited onto the surface of beta alumina. Alternatively, the induction heating wires, or fiber may be embedded in the beta alumina. In yet another alternative, the induction wires, or fibers may be suspended in the molten sodium tetrachloroaluminate. The induction heating wires, or fibers may be used to increase the ionic conductivity of the beta alumina and or the molten sodium tetrachloroaluminate in cold weather. In addition, the induction heating wires, or fibers may be used to molten the sodium tetrachloroaluminate, and as an indirect result molt the sodium anode. In addition, the induction heating wires, or fibers, may be used to maintain the operating temperature of a Zebra battery in the preferred temperate range of 225 to 350 degrees Celsius. In addition, the induction heating wires, or fibers may be used to lower or reduce the startup time of a Zebra battery in cold weather or enabling it to remain at room temperature when not in use.

An alternative example of a molten-salt battery may include, for example, a sodium-sulfur battery, wherein at elevated temperatures, and during operation, is composed of a molten sodium anode and a molten sulfur cathode. The cathode and anode are separated by a ceramic layer of beta alumina, typically in tubular form, serving as the separator and solid-state electrolyte. Inductive heating wires, or fibers may be positioned on to the inner surface of the tubular beta alumina. Alternatively, the induction heating wires, or fibers may be position on to the outer surface of the tubular beta alumina, or in some instances on both surface. In yet another alternative, the induction heating wires, or fibers may be embedded in the beta alumina. The induction heating wires, or fibers may be used to increase the ionic conductivity of the beta alumina in cold weather. In addition, the induction heating wires, or fibers may be used to molten the electrodes of sodium-sulfur battery. In addition, the induction heating wires, or fibers, may be used to maintain the operating temperature of a sodium-sulfur battery in the preferred temperate range of 225 to 350 degrees Celsius. In addition, the induction heating wires, or fibers may be used to lower or reduce the startup time of a sodium-sulfur battery in cold weather or enabling it to remain at room temperature when not in use.

Example 11: In an example, induction heating wires or fibers may be embedded in the ceramic-polymer composite electrolyte of a metal-based secondary battery. A metal-based secondary battery may include, for example, a solid-state lithium metal battery. A ceramic-polymer composite may be composed of garnet-structure lithium lanthanum zirconium oxide and poly(ethylene oxide) (PEO). A solid-state lithium metal battery may further be composed of metallic lithium as the anode and a composite cathode formulated with $LiNi_xCo_yMn_zO_2$ and PEO. In some instances, a lithium metal battery may consist of an organic liquid electrolyte, in addition to the ceramic-polymer composite, such as dimethyl carbonate with one molar of lithium hexafluorophosphate, which may be termed a semi-solid-state or hybrid lithium metal battery.

Example 12: In an example, induction heating wires or fibers may be embedded in the ion conducting media of a fuel cell. An ion conducting media may include, for example, a proton exchange membrane, for example Nafion, in a proton exchange membrane fuel cell (PEN/WC). A PEMFC may be composed of porous carbon paper as the electrodes, wherein platinum is used as the catalyst on the anode side, and nickel as the catalyst on the cathode side. The induction heating wires, or fibers may be used to increase the ionic conductivity of Nafion in cold weather. In addition, the induction heating materials may be used to maintain the temperature of the PEMFC in the preferred temperate range of 50 to 100 degrees Celsius. In addition, the induction heating materials may be used to lower the startup time of the PEMFC in cold weather.

An alternative example may include, for example, a solid acid fuel cell (SAFC), wherein the induction heating wires, or fibers are embedded in the solid acid electrolyte of a SAFC. A solid acid electrolyte may include, for example, cesium hydrogen sulfate ($CsHSO_4$) or cesium dihydrogen phosphate ($CsH_2PO_4$). The induction heating wires, or fibers may be used to facilitate a phase transition of the solid acid electrolyte, wherein it becomes a highly disordered superprotonic structure with an increased ionic conductivity. In addition, the induction heating wires, or fibers, may be used to maintain an operating temperature of a SAFC in the preferred range of 100 to 200 degrees Celsius. In addition, the induction heating wires, or fibers, may be used to reduce the startup time of an SAFC, particularly in cold weather.

Example 13: In an example, induction heating wires or fibers may be embedded in the ion selective membrane of a redox type flow battery. A redox type flow battery may include, for example, a vanadium redox flow battery, wherein ion selective membrane is composed of Nafion. A vanadium redox flow battery may be described as a flow battery with a reactor cell composed of a porous cathode, such as carbon paper, on the catholyte side, and a porous anode, such as carbon cloth on the catholyte side, separated by the Nafion. The anolyte and catholyte may be aqueous in nature and formed by the dissolving vanadium pentoxide ($V_2O_5$) in sulfuric acid; wherein the anolyte is in an oxidation state of $V^{3+}\leftrightarrow V^{2+}$, and the catholyte is in the oxidation state of $V^{5+}\leftrightarrow V^{4+}$. The induction heating wires, or fibers may be embedded within the Nafion. Alternatively, the induction heating wires, or fibers may be formed on the surface of the Nafion. In yet another alternative, the induction heating wires, or fibers may be embedded in the Nafion and on the surface of Nafion. The induction heating wires, of fibers may be used to increase the ionic or vanadium conductivity of the Nafion in cold weather. The induction heating wires, or fibers may be used increase the operating temperature of the vanadium redox flow battery up to 60 degrees Celsius.

Example 14: In an example, an induction heating mesh may be embedded in the liquid electrolyte of a primary battery, wherein the primary battery may include, for example, a Zinc-air battery. A Zinc-air batteries may contain a zinc metal anode and a porous carbon cathode containing a catalyst, such as cobalt oxide, wherein the liquid electrolyte is an alkali metal hydroxide solution such as potassium hydroxide. An induction heating mesh may be positioned inside the potassium hydroxide to increase the ionic conductivity of zinc ions in cold weather. The induction heating mesh may be coated with an electronic insulating layer allowing it to make contact with the zinc anode and porous cathode in the case of a button cell.

An alternative example of a primary battery may include, for example, an aluminum-air battery. An aluminum-air battery may be composed of an aluminum metal anode and a porous carbon cathode, supported on a nickel grid, containing a catalyst, such as cobalt oxide, wherein the liquid electrolyte is an alkali metal hydroxide solution such as potassium hydroxide. Alternatively, seawater may be used as an electrolyte in some instances. A porous hydrophobic layer of polytetrafluoroethylene (PTFE) may be coated onto the cathode. An induction heating mesh may be positioned inside the potassium hydroxide, or in some cases seawater, to increase the ionic conductivity of aluminum ions in cold weather. The induction heating mesh may be coated with an electronic insulating layer allowing it to make contact with the aluminum anode and porous cathode in the case of a compact cell.

Example 15: In an example, an induction heating mesh may be embedded in the electrolyte of a secondary battery, wherein the secondary battery may include, for example, a lithium-air battery. A lithium air battery may be composed of a lithium metal anode, a mesoporous carbon coated on a nickel grid with a platinum catalyst coated on the surface, and an organic or aprotic electrolyte. An aprotic electrolyte may include, for example, an ethylene carbonate/propylene carbonate mixture with lithium hexafluoroarsenate(V) (Li-$AsF_6$) as the ionic conducting salt. An induction heating mesh may be positioned inside the organic electrolyte to increase the ionic conductivity of lithium ions in cold weather. The induction heating mesh may be coated with an electronic insulating layer allowing it to make contact with the lithium anode and porous cathode in the case of a compact cell such a cylindrical cell.

Example 16: In an example, an induction heating mesh may be embedded in the ceramic-polymer composite electrolyte of a metal-based secondary battery. A metal-based secondary battery may include, for example, a solid-state lithium metal battery. A ceramic-polymer composite may be composed of NASICON-structured LAGP ($Li_{1-x}Al_xGe_{2-x}(PO_4)_3$) and poly(ethylene oxide) (PEO). A solid-state lithium metal battery may further be composed of metallic lithium as the anode and a composite cathode formulated with lithium nickel cobalt aluminum oxide ($LiNi_xCo_yAl_zO_2$) and PEO. In some instances, a lithium metal battery may consist of an organic liquid electrolyte, in addition to the ceramic-polymer composite, such as propylene carbonate with one molar of lithium hexafluorophosphate, which may be termed a semi-solid-state or hybrid lithium metal battery. The induction heating mesh may be coated with an electronic insulating layer allowing it to make contact with the lithium anode and composite cathode in the instance the lithium metal battery is under pressure. The induction heating mesh may be used to increase the ionic conductivity of the ceramic-polymer composite in cold weather. In some instances, the ceramic-polymer composite may be described as being embedded within the induction heating mesh, wherein all components form the ceramic-polymer composite solid-state electrolyte.

Example 17: In an example, an induction heating mesh may be embedded in the ionic conducting membrane of a fuel cell; wherein the fuel cell is a high temperature solid oxide fuel cell (SOFC). The oxygen ion conducting membrane may be composed of, for example, ceramic yttria-stabilized zirconia (YSZ) or cerium gadolinium oxide (CGO), wherein the induction heating mesh is a high temperature material capable of being integrated into the ceramic material during its formation, such as silicon carbide. The ionic conducting ceramic may have the shape of, for example, planar, non-planar, rolled, rod, tubular, etc. A SOFC may be composed of porous electrodes, wherein platinum is used as the catalyst on the anode side, and nickel as the catalyst on the cathode side. The induction heating mesh may be used to heat up and maintain the operating temperature of a SOFC in the preferred temperature range of 800 to 1000 degrees Celsius, to enhance oxygen conductivity. In addition, the induction heating mesh may be used to reduce the startup time of the SOFC, particularly in cold weather.

An alternative example may include, for example, a high temperature molten-carbonate fuel cell (MCFC); wherein an induction heating mesh is embedded in a potassium carbonate salt electrolyte. The induction heating mesh may be heated up to a sufficient temperature in order to liquefy the potassium carbonate. An induction heating mesh may be composed of, for example, silicon carbide. The induction heating mesh may be used to increase the carbonate ion conductivity, particularly in cold weather. The induction heating mesh may be used to increase and maintain the operating temperature of an MCFC, preferably in the range of 600 to 700 degrees Celsius. In addition, the induction heating mesh may be used to reduce the startup time of the MCFC, practically in cold weather.

Example 18: In an example, an induction heating mesh may be embedded in the ion selective membrane of a flow battery; wherein the flow battery is hybrid flow battery. A hybrid flow battery may include, for example, a lithium hybrid flow battery. A lithium hybrid flow battery may be comprised of a catholyte tank, which is used to store the catholyte, and a flow battery reactor cell. A catholyte may be composed diethyl carbonate with lithium hexafluorophosphate ($LiPF_6$) as the ionic conducting salt. A flow battery cell reactor may be composed of a porous cathode and a lithium metal anode, which are separated by an ion selective membrane. An ion selective membrane may include, for example, garnet-structure lithium lanthanum zirconium oxide formed onto, or into, a silicon carbide mesh, acting as the induction heating mesh. An ion conducting solution, such as lithium hydroxide, may be used between lithium lanthanum zirconium oxide and lithium metal as an ion conducting media in order to facilitate lithium conduction on the anolyte side of the flow battery. An induction heating mesh may be used to increase the lithium ion conduction through the lithium lanthanum zirconium oxide, particularly in cold weather.

The above described systems and methods can be ascribed to the induction heating of all types of electrolytes in electrochemical systems using induction heating materials embedded in the electrolytes.

The above describe systems and methods can be ascribed to all types of electrochemical cells including, for example, primary batteries, secondary batteries, electrochemical capacitors, flow batteries, air-batteries, fuel cells, etc.

The above describe systems and methods can be ascribed to electrochemical cells of various sizes ranging from button cell size to large format, including those used in the grid, wherein the large format is further described in the art.

The above described systems and methods can be ascribed for different electrochemical cell configurations, such as coin cells, button cells, cylindrical cells, pouch cells, prismatic cell, or any other types of cells to serve different applications.

The above described system and methods can be ascribed for all liquid, polymer, gel-polymer, molten-salt, solid-state, ceramic-polymer composite, semi-solid-state, or hybrid based electrochemical systems.

The above described systems and methods may include an induction heating system configured to heat the electrolyte by induction. For example, an induction heating system may include an electromagnet and an electronic oscillator that passes a high-frequency alternating current through the electromagnet, which induces eddy currents in the material to be heated.

The above described systems and methods can be used in applications including automotive, handheld electronics, grid storage backup, load balancing, medical, wearables, etc.

The above described systems and methods can be used in cold weather climates including those that are not on or in the vicinity of earth including in space, such as space stations, satellites, both natural and unnatural, and other planetary bodies such as mars.

What is claimed:

1. An internal heating method to heat the electrolyte of a battery, the battery comprising: an anode; a cathode; an electrolyte; and a plurality of inductively heatable structures fully embedded or fully suspended in the electrolyte, wherein each inductively heatable structure comprises an inductively heatable material coated with an insulative layer, the insulative layer having a thickness (t) in a range of $0<t<1000$ nm, the method comprising:
   passing an alternating current through an induction coil generating a magnetic field and consequently generating eddy currents inside the inductively heatable structures, whereby the eddy currents generated inside the inductively heatable structures provide heat to raise a temperature of the electrolyte in which the inductively heatable structures are fully embedded or fully suspended; and
   at least one of charging and discharging the battery while the electrolyte is in the heated state.

2. The internal heating method of claim 1, wherein the electrolyte is a solid electrolyte, and wherein the plurality of inductively heatable structures are fully embedded in the solid electrolyte.

3. The internal heating method of claim 2, wherein the solid electrolyte includes at least one of a solid polymer electrolyte, a solid-state ceramic electrolyte, and a ceramic-polymer composite electrolyte.

4. The internal heating method of claim 2, wherein the solid electrolyte includes a solid polymer electrolyte.

5. The internal heating method of claim 4, wherein the solid polymer electrolyte includes an ionic or nonionic conducting polymer with an ionic conducting salt dissolved within.

6. The internal heating method of claim 2, wherein the solid electrolyte includes a solid-state ceramic electrolyte.

7. The internal heating method of claim 6, wherein the solid-state ceramic electrolyte includes an ionic conducting ceramic material.

8. The internal heating method of claim 7, wherein the ionic conducting ceramic material comprises at least one of a garnet-like structured oxide, a NASICON-structured LATP or LAGP, a perovskite-type (Li, La)TiO$_3$, an anti-perovskite Li$_3$OX (X=F—, Cl—, Br—, I—), Li$_3$YH$_6$ (H=F, Cl, Br, I and Y is a rare earth metal), and an argyrodite with the general formula of $L_{12-m-x}(M_m Y_4^{2-}) Y_{2-x}^{2-} X_x^-$.

9. The internal heating method of claim 2, wherein the solid electrolyte includes a ceramic-polymer composite electrolyte.

10. The internal heating method of claim 9, wherein the ceramic-polymer composite electrolyte includes a mixture of polymer and an ionic conductive ceramic material.

11. The internal heating method of claim 10, wherein the polymer includes an ionic conducting polymer or a nonionic conducting polymer with an ionic conducting salt dissolved within.

12. The internal heating method of claim 2, wherein the inductively heatable structures comprise a particulate structure, an aggregate structure, a foam structure, or a combination thereof.

13. The internal heating method of claim 2, wherein the inductively heatable structures comprise at least one of iron, steel, nickel, Zinc, cobalt, aluminum, copper, silicon, carbon, neodymium, manganese, ferrite, magnetite (Fe$_3$O$_4$), brass, silicon carbide, Co$_2$Ba$_2$Fe$_{12}$O$_{22}$, SrFe$_{12}$O$_{19}$, and alloys and mixtures thereof.

14. The internal heating method of claim 2, wherein the inductively heatable structures are on or in a battery separator.

15. The internal heating method of claim 2, wherein the inductively heatable structures are on a fabric support used to support the solid electrolyte.

16. The internal heating method of claim 2, wherein the electrochemical system is positioned within an electric vehicle before the step of passing the alternating current through the induction coil generating the magnetic field and consequently generating eddy currents inside the inductively heatable structures heating the solid electrolyte.

17. The internal heating method of claim 1, wherein the alternating current includes at least one of a continuous alternative current and a pulsed alternating current.

18. An internal heating method to heat the electrolyte of a battery, the battery comprising: an anode; a cathode; an electrolyte; and a plurality of inductively heatable structures fully embedded or fully suspended in the electrolyte, wherein each inductively heatable structure has a core-shell structure comprising an inductively heatable core and an insulative shell, the method comprising:
   passing an alternating current through an induction coil generating a magnetic field and consequently generating eddy currents inside the inductively heatable structures, whereby the eddy currents generated inside the inductively heatable structures provide heat to raise a temperature of the electrolyte in which the inductively heatable structures are fully embedded or fully suspended; and
   at least one of charging and discharging the battery while the electrolyte is in the heated state,
   wherein the insulative shell has a thickness (t) in a range of $0<t<1000$ nm.

* * * * *